US009568973B2

(12) United States Patent
Raman et al.

(10) Patent No.: US 9,568,973 B2
(45) Date of Patent: Feb. 14, 2017

(54) REMOTE ENERGY MANAGEMENT USING PERSISTENT SMART GRID NETWORK CONTEXT

(71) Applicant: Verizon Patent and Licensing, Inc., Basking Ridge, NJ (US)

(72) Inventors: Madhusudan Raman, Sherborn, MA (US); Jean Francois Dubois, Boothbay Harbor, ME (US); Renu Chipalkatti, Lexington, MA (US)

(73) Assignee: VERIZON PATENT AND LICENSNG INC., Basking Ridge, NJ (US)

( * ) Notice: Subject to any disclaimer, the term of this patent is extended or adjusted under 35 U.S.C. 154(b) by 11 days.

(21) Appl. No.: 13/710,866

(22) Filed: Dec. 11, 2012

(65) Prior Publication Data

US 2013/0103221 A1    Apr. 25, 2013

Related U.S. Application Data

(63) Continuation of application No. 12/837,776, filed on Jul. 16, 2010, now Pat. No. 8,335,596.

(51) Int. Cl.
*G06F 1/32* (2006.01)
*G01R 21/00* (2006.01)
*G06F 9/50* (2006.01)

(52) U.S. Cl.
CPC ........... *G06F 1/3206* (2013.01); *G06F 9/5094* (2013.01); *Y02B 60/142* (2013.01)

(58) Field of Classification Search
CPC ..... G06F 1/3206; G06F 9/5094; Y02B 60/142

USPC ..... 700/295, 291; 705/37; 713/193; 715/738
See application file for complete search history.

(56) References Cited

U.S. PATENT DOCUMENTS

| | | | |
|---|---|---|---|
| 7,313,133 B2 * | 12/2007 | Yarlagadda ................... 370/352 |
| 7,479,949 B2 * | 1/2009 | Jobs et al. .................... 345/173 |
| 7,693,670 B2 * | 4/2010 | Durling et al. ................. 702/62 |
| 7,705,484 B2 * | 4/2010 | Horst .............................. 307/35 |
| 7,904,209 B2 * | 3/2011 | Podgorny et al. ............ 700/276 |
| 7,945,401 B2 * | 5/2011 | Bowdry ................. G01D 4/004 700/22 |
| 7,983,798 B2 * | 7/2011 | Boss et al. .................... 700/296 |
| 8,010,815 B2 * | 8/2011 | Hamilton et al. ............. 713/320 |
| 8,031,726 B2 * | 10/2011 | Ansari et al. .................. 370/401 |
| 8,065,041 B2 * | 11/2011 | Yao ........................ G06Q 10/06 700/286 |
| 8,090,480 B2 * | 1/2012 | Brumfield et al. ........... 700/296 |

(Continued)

*Primary Examiner* — Mohammad Ali
*Assistant Examiner* — Kelvin Booker

(57) ABSTRACT

A device may include a memory to store control policies set for a network of smart grid devices connected to a power grid, the control policies including an energy consumption threshold associated with the network of smart grid devices; and a processor configured to obtain network content including energy consumption data associated with the network of smart grid devices, compare the energy consumption data to the energy consumption threshold associated with the network of smart grid devices, generate a first instruction with respect to energy consumption associated with network of smart grid devices, and generate a second instruction with respect to replenishment of unforced capacity associated with the network of smart grid devices.

20 Claims, 10 Drawing Sheets

(56) References Cited

U.S. PATENT DOCUMENTS

| | | | | |
|---|---|---|---|---|
| 8,095,245 | B1* | 1/2012 | Mannepalli | F24J 2/40 700/286 |
| 8,166,164 | B1* | 4/2012 | Luna et al. | 709/224 |
| 8,170,695 | B2* | 5/2012 | Spicer | G05B 15/02 700/22 |
| 8,326,470 | B2* | 12/2012 | Mirle | 701/2 |
| 8,386,087 | B2* | 2/2013 | Spicer | H02J 3/14 700/22 |
| 8,457,802 | B1* | 6/2013 | Steven | G06Q 10/00 700/291 |
| 8,473,111 | B1* | 6/2013 | Shankar | H02J 3/14 700/293 |
| 8,600,556 | B2* | 12/2013 | Nesler | G05B 15/02 370/395.52 |
| 8,874,277 | B2* | 10/2014 | Kouroussis | H02J 3/1892 700/286 |
| 8,902,149 | B2* | 12/2014 | Kerofsky | G09G 3/3406 345/102 |
| 9,002,761 | B2* | 4/2015 | Montalvo | G06Q 10/06 322/38 |
| 9,041,354 | B2* | 5/2015 | Lee | H02J 7/35 307/25 |
| 2003/0221118 | A1* | 11/2003 | Walker | 713/193 |
| 2004/0205032 | A1* | 10/2004 | Routtenberg | B60L 11/1881 705/400 |
| 2008/0165789 | A1* | 7/2008 | Ansari et al. | 370/401 |
| 2008/0172312 | A1* | 7/2008 | Synesiou | G06Q 10/00 705/34 |
| 2008/0192770 | A1* | 8/2008 | Burrows et al. | 370/466 |
| 2008/0219239 | A1* | 9/2008 | Bell et al. | 370/351 |
| 2008/0252141 | A1* | 10/2008 | Horst | 307/35 |
| 2008/0281472 | A1* | 11/2008 | Podgorny et al. | 700/276 |
| 2008/0281663 | A1* | 11/2008 | Hakim et al. | 705/8 |
| 2009/0037509 | A1* | 2/2009 | Parekh et al. | 709/201 |
| 2009/0045804 | A1* | 2/2009 | Durling et al. | 324/140 R |
| 2009/0061825 | A1* | 3/2009 | Neelakantan et al. | 455/412.1 |
| 2009/0067441 | A1* | 3/2009 | Ansari et al. | 370/401 |
| 2009/0144568 | A1* | 6/2009 | Fung | 713/300 |
| 2009/0204831 | A1* | 8/2009 | Cousson et al. | 713/322 |
| 2009/0222142 | A1* | 9/2009 | Kao et al. | 700/291 |
| 2009/0228825 | A1* | 9/2009 | Van Os et al. | 715/780 |
| 2009/0240380 | A1* | 9/2009 | Shah et al. | 700/295 |
| 2009/0265568 | A1* | 10/2009 | Jackson | G06F 1/3203 713/320 |
| 2010/0063642 | A1* | 3/2010 | Boss et al. | 700/291 |
| 2010/0063643 | A1* | 3/2010 | Boss et al. | 700/291 |
| 2010/0071053 | A1* | 3/2010 | Ansari et al. | 726/12 |
| 2010/0094475 | A1* | 4/2010 | Masters et al. | 700/292 |
| 2010/0100253 | A1* | 4/2010 | Fausak | G01D 4/002 700/295 |
| 2010/0138363 | A1* | 6/2010 | Batterberry et al. | 705/412 |
| 2010/0138682 | A1* | 6/2010 | Obana et al. | 713/340 |
| 2010/0145542 | A1* | 6/2010 | Chapel et al. | 700/295 |
| 2010/0161146 | A1* | 6/2010 | Boss et al. | 700/291 |
| 2010/0162374 | A1* | 6/2010 | Nair | 726/7 |
| 2010/0169227 | A1* | 7/2010 | Boss et al. | 705/80 |
| 2010/0174419 | A1* | 7/2010 | Brumfield et al. | 700/295 |
| 2010/0181988 | A1* | 7/2010 | Hong et al. | 323/318 |
| 2010/0217449 | A1* | 8/2010 | Musti et al. | 700/291 |
| 2010/0217550 | A1* | 8/2010 | Crabtree et al. | 702/62 |
| 2010/0217642 | A1* | 8/2010 | Crubtree | G06Q 10/00 705/7.12 |
| 2010/0217837 | A1* | 8/2010 | Ansari et al. | 709/218 |
| 2010/0218108 | A1* | 8/2010 | Crabtree et al. | 715/738 |
| 2010/0220845 | A1* | 9/2010 | Oliver et al. | 379/202.01 |
| 2010/0228601 | A1* | 9/2010 | Vaswani | G06Q 10/06 705/308 |
| 2010/0231612 | A1* | 9/2010 | Chaudhri et al. | 345/684 |
| 2010/0262313 | A1* | 10/2010 | Chambers et al. | 700/295 |
| 2010/0262650 | A1* | 10/2010 | Chauhan et al. | 709/203 |
| 2010/0277300 | A1* | 11/2010 | Cohn et al. | 340/506 |
| 2010/0277302 | A1* | 11/2010 | Cohn et al. | 340/514 |
| 2010/0277315 | A1* | 11/2010 | Cohn et al. | 340/540 |
| 2010/0280635 | A1* | 11/2010 | Cohn et al. | 700/90 |
| 2010/0280637 | A1* | 11/2010 | Cohn et al. | 700/90 |
| 2010/0281135 | A1* | 11/2010 | Cohn et al. | 709/217 |
| 2010/0281161 | A1* | 11/2010 | Cohn et al. | 709/224 |
| 2010/0281312 | A1* | 11/2010 | Cohn et al. | 714/49 |
| 2010/0283606 | A1* | 11/2010 | Tsypin et al. | 340/540 |
| 2010/0286937 | A1* | 11/2010 | Hedley et al. | 702/60 |
| 2010/0295672 | A1* | 11/2010 | Hyland et al. | 340/539.1 |
| 2010/0321587 | A1* | 12/2010 | Kerofsky | 348/730 |
| 2010/0332373 | A1* | 12/2010 | Crabtree et al. | 705/37 |
| 2011/0035072 | A1* | 2/2011 | Jackson | 700/291 |
| 2011/0049984 | A1* | 3/2011 | Son | 307/31 |
| 2011/0061014 | A1* | 3/2011 | Frader-Thompson et al. | 715/771 |
| 2011/0063126 | A1* | 3/2011 | Kennedy et al. | 340/870.02 |
| 2011/0118890 | A1* | 5/2011 | Parsons | 700/295 |
| 2011/0133693 | A1* | 6/2011 | Lowenthal et al. | 320/109 |
| 2011/0145607 | A1* | 6/2011 | Watakabe et al. | 713/310 |
| 2011/0164058 | A1* | 7/2011 | Lemay | 345/651 |
| 2011/0172837 | A1* | 7/2011 | Forbes, Jr. | G06Q 10/00 700/291 |
| 2011/0172838 | A1* | 7/2011 | Pai et al. | 700/292 |
| 2011/0175826 | A1* | 7/2011 | Moore et al. | 345/173 |
| 2011/0178650 | A1* | 7/2011 | Picco | 700/295 |
| 2011/0179372 | A1* | 7/2011 | Moore et al. | 715/773 |
| 2011/0179373 | A1* | 7/2011 | Moore et al. | 715/773 |
| 2011/0225368 | A1* | 9/2011 | Burge, III | 711/118 |
| 2011/0231320 | A1* | 9/2011 | Irving | 705/80 |
| 2011/0242138 | A1* | 10/2011 | Tribble | 345/663 |
| 2011/0248863 | A1* | 10/2011 | Johnson et al. | 340/686.1 |
| 2011/0252357 | A1* | 10/2011 | Chaudhri | 715/780 |
| 2011/0252369 | A1* | 10/2011 | Chaudhri | 715/830 |
| 2011/0252370 | A1* | 10/2011 | Chaudhri | 715/830 |
| 2011/0252376 | A1* | 10/2011 | Chaudhri | 715/835 |
| 2011/0252380 | A1* | 10/2011 | Chaudhri | 715/836 |
| 2011/0252381 | A1* | 10/2011 | Chaudhri | 715/838 |
| 2011/0268286 | A1* | 11/2011 | Sanchez et al. | 381/59 |
| 2011/0270453 | A1* | 11/2011 | Kalogridis | H02J 3/14 700/291 |
| 2011/0270940 | A1* | 11/2011 | Johnson et al. | 709/207 |
| 2011/0308638 | A1* | 12/2011 | Hyland et al. | 137/299 |
| 2011/0316663 | A1* | 12/2011 | Tarkoma | 340/3.1 |
| 2012/0022700 | A1* | 1/2012 | Drees et al. | 700/276 |
| 2012/0023226 | A1* | 1/2012 | Petersen et al. | 709/224 |
| 2012/0053750 | A1* | 3/2012 | Viassolo et al. | 700/297 |
| 2012/0069131 | A1* | 3/2012 | Abelow | 348/14.01 |
| 2012/0095610 | A1* | 4/2012 | Chapel et al. | 700/297 |
| 2012/0259583 | A1* | 10/2012 | Noboa et al. | 702/179 |
| 2013/0030553 | A1* | 1/2013 | Lee | H04L 12/12 700/22 |
| 2013/0035802 | A1* | 2/2013 | Khaitan et al. | 700/297 |
| 2013/0096727 | A1* | 4/2013 | Brandt et al. | 700/291 |
| 2013/0113291 | A1* | 5/2013 | Recker et al. | 307/80 |
| 2013/0162215 | A1* | 6/2013 | Cooper | 320/127 |
| 2014/0298349 | A1* | 10/2014 | Jackson | G06Q 50/06 718/104 |
| 2015/0082868 | A1* | 3/2015 | Hyland et al. | 73/40.5 R |
| 2015/0094968 | A1* | 4/2015 | Jia | G06Q 40/04 702/60 |
| 2015/0234441 | A1* | 8/2015 | Jackson | G06F 1/3203 713/300 |

* cited by examiner

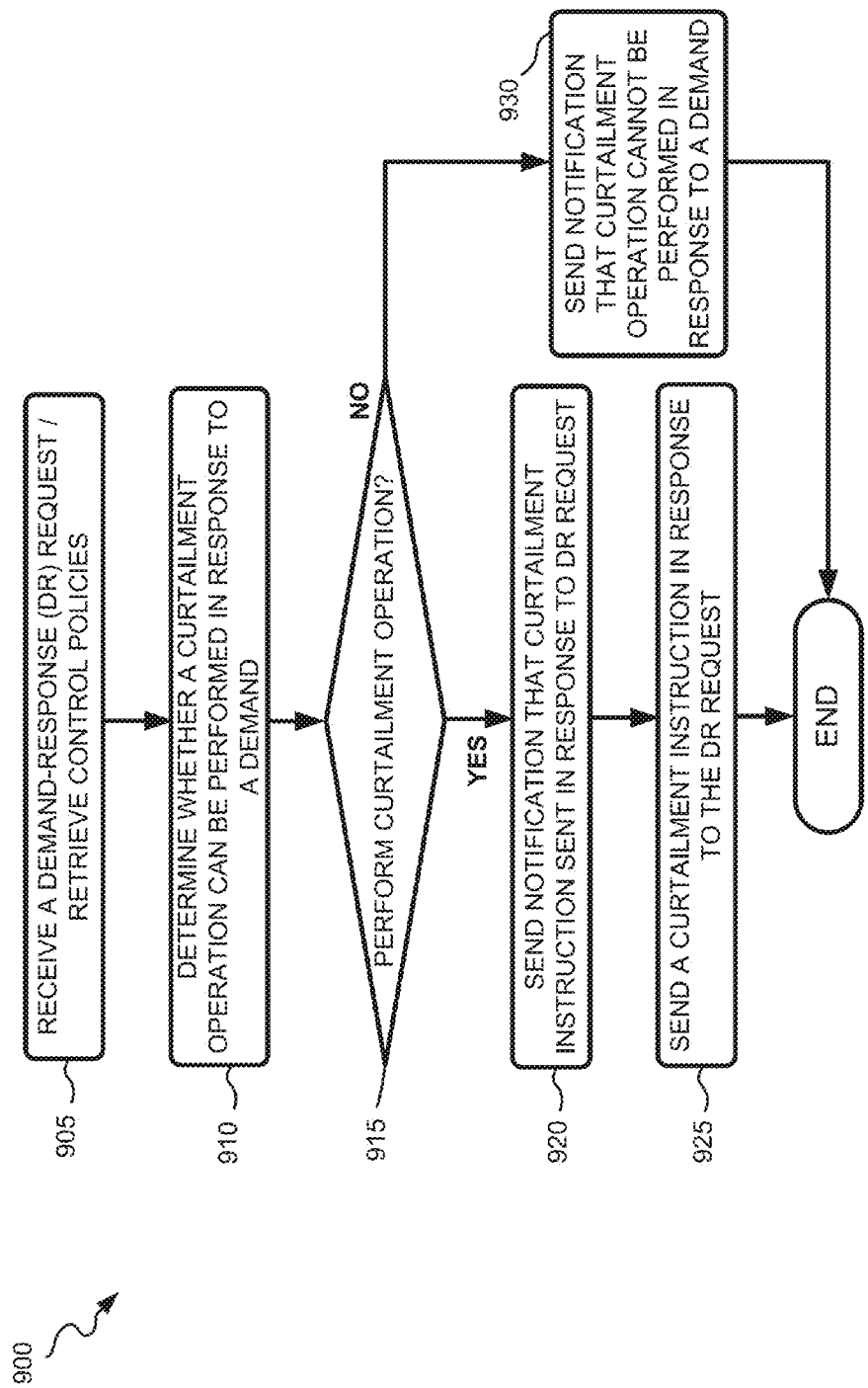

REMOTE ENERGY MANAGEMENT USING PERSISTENT SMART GRID NETWORK CONTEXT

CROSS-REFERENCE TO RELATED APPLICATIONS

This application is a continuation of U.S. patent application Ser. No. 12/837,776, filed on Jul. 16, 2010, the disclosure of which is hereby incorporated herein by reference in its entirety.

BACKGROUND

Smart grid devices are being used more and more in energy management systems to manage and control power consumption in smart grid networks installed in fixed, mobile or stationary buildings, facilities, plants, vehicles, installations, or other entities that that are connected to the power grid from which electrical power may be received. Some examples of smart grid devices include programmable HVAC systems, programmable thermostats, programmable controllers that control power cycles of certain devices (e.g., lights, appliances, etc.), computers, and other appliances equipped with power management features (e.g., sleep, hibernate, low power modes, etc.). Other forms of smart grid devices include devices that provide alternative energy sources to smart grid networks, such as a battery bank (e.g., that stores power for use during peak times or off-peak times), uninterruptible power supplies (UPS), generators, solar devices, wind power devices, etc. The use of smart grid devices reduces total power consumption by using less power than conventional devices. Additionally, the use of smart grid devices, in buildings or facilities, reduces demand on the power grid and reduces energy costs by enabling a greater portion of the total power to be consumed during non-peak times when energy costs are cheaper.

BRIEF DESCRIPTION OF THE DRAWINGS

FIG. 9 is a flowchart of an example process for performing a demand-response operation.

DETAILED DESCRIPTION OF PREFERRED EMBODIMENTS

Figure 1:
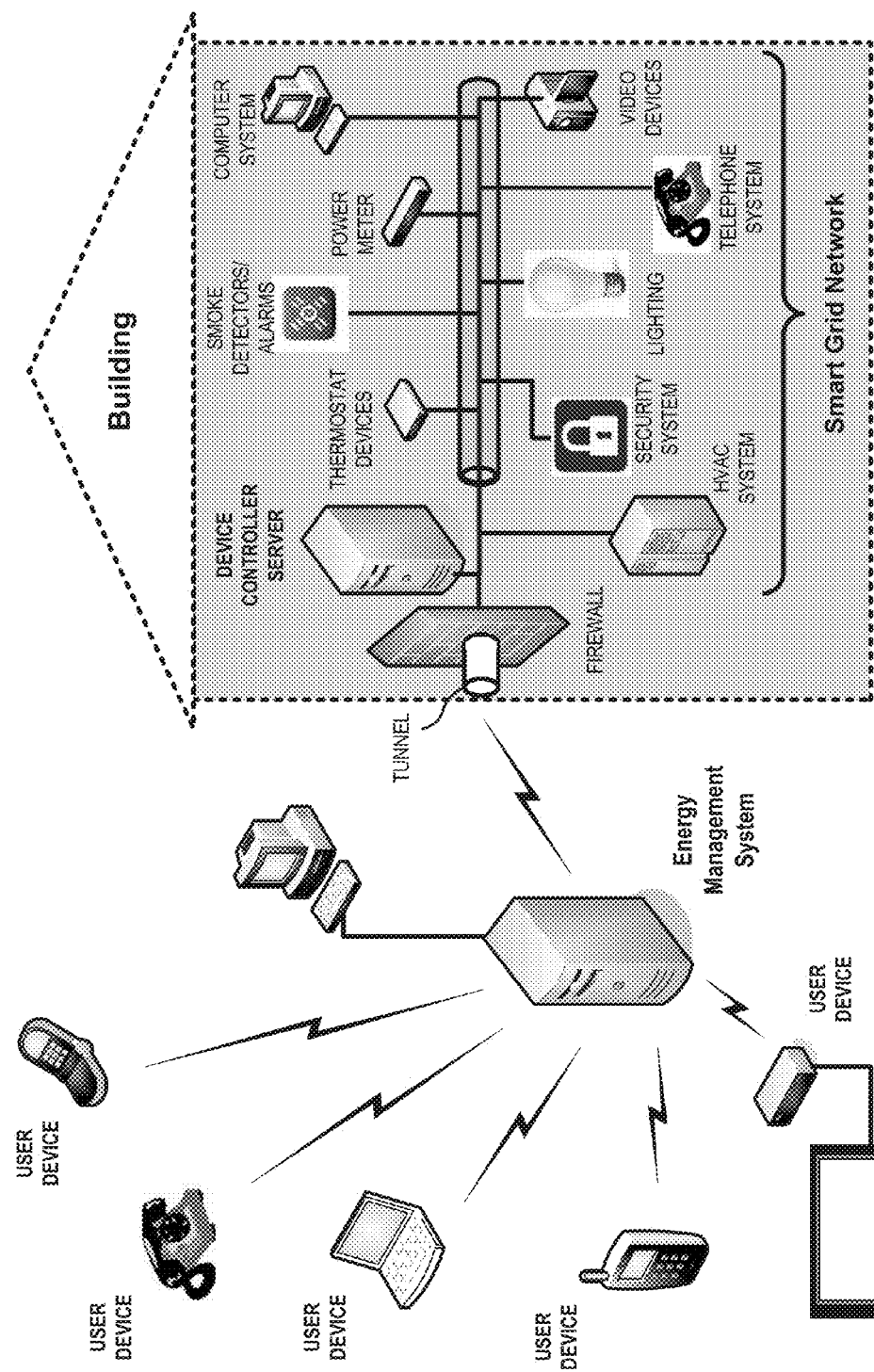
FIG. 1 is a diagram that illustrates an overview of a remote energy management system that uses a persistent smart grid context implementation described herein.

The following detailed description refers to the accompanying drawings. The same reference numbers in different drawings may identify the same or similar elements. Also, the following detailed description does not limit the invention.

An implementation described herein may include systems and/or methods that provide for remote energy management using a persistent smart grid network context (hereinafter referred to as "remote energy management"). More particularly, the remote energy management implementation may use a remote energy management application (hereinafter referred to as an "energy application") to obtain persistent network content (hereinafter referred to as "network content"), from smart grid devices associated with the smart grid network, that can be used to perform operations to reduce and/or manage the quantity of power consumed by the smart grid network. The energy application may communicate with the smart grid devices using a tunneling protocol that permits the operations to be performed from a location that is remote from the location of all or a portion of the smart grid devices.

In one example implementation, the energy application may establish smart grid network energy management control policies (hereinafter referred to as "control policies") and/or may generate an energy management profile, associated with a smart grid network, such as a smart grid network installed in a building (e.g., an office building, a factory, a warehouse, a stadium, a residence, a shopping center, a church, etc.), a facility (e.g., an airport, a mass transit system, a railroad system, a military base, etc.), and/or some other entity (e.g., a ship, an aircraft, a train, etc.), which may be used to configure the smart grid network and/or to perform a remote energy management operation.

In another example implementation, the energy application may register smart grid devices, associated with a smart grid network, using a tunneling protocol that permits the smart grid devices to present network content to the smart grid network as a web service and/or via a messaging protocol.

In yet another example implementation, the energy application may use network content, obtained from the smart grid network, to determine whether a condition, associated with a device within the smart grid network, exists. As further described herein, the energy application may use network content, obtained from the smart grid network, to determine whether to perform a curtailment operation to reduce power consumption below a power threshold and/or to reduce energy costs, associated with the power consumption, below a cost threshold.

In still a another example implementation, the energy application may use network content, obtained from the smart grid network, to determine whether to utilize unforced capacity to reduce and/or eliminate demand, by the smart grid network, on a power grid associated with a power generation utility from which the smart grid network receives power. The term "unforced capacity", as described herein, may be a measure of a quantity of power that a smart grid network is capable of producing e.g., using devices that generate power) and/or is capable of storing (e.g., using devices that store power), which may be consumed by the smart grid network (e.g., during a demand-response operation described below, a curtailment operation, and/or other operations) and/or may be transmitted to the power grid pursuant to an agreement with a power generation utility associated with the power grid.

As still further described herein, the energy application may, in response to a demand-response request received from the power generation utility, reduce the quantity of power that is being received from the power grid associated with the power generation utility.

FIG. 1 is a diagram that illustrates an overview of a remote energy management implementation described herein. As illustrated in FIG. 1, an energy management system may connect, via a security firewall, with a set of smart grid devices in a smart grid network associated with a building. The smart grid devices may include, for example, devices that are capable of communicating with a network, such as thermostat devices, smoke detector/alarm devices, a computer system, a heating, ventilation, and air conditioning (HVAC) system, a security system, a lighting system, a telephone system, a close circuit television (CCTV) system (e.g., shown as video devices), a device controller server, and/or other smart grid devices (e.g., fans, elevators, air quality sensors, etc.).

Energy management policies and/or thresholds may be established. For example, the energy management system may present a user interface via, which building characteristics, such as physical attributes (e.g., floor space, quantity of floors, etc.), usage attributes (e.g., occupied space, vacant space, administrative space, storage space, special use space, etc.), may be received. The physical attributes may be used, together with other attributes (e.g., historical information, climate conditions, etc.), to generate a consumption profile for the building. In another example, the energy management system may receive, via a user interface (UI), information associated with each smart grid device of the smart grid network and may use the received information to establish a device inventory that includes device identification information, device type/category, device power consumption information, etc. The energy management system may use the consumption profile and/or information associated with the device inventory to establish smart grid network control policies, and/or to configure the smart grid network.

A registration operation may be performed by the energy management system and network content may be obtained from smart grid devices. For example, the energy management system may perform an operation to register all or a portion of the smart grid devices using a particular tunneling protocol that permits the energy management system to communicate with the smart grid devices from a location that is remote relative to the location of the smart grid devices. Additionally, or alternatively, the energy management system may use the tunneling protocol to enable each smart grid device to present network content, to the smart grid network, as a web service that may be discovered, searched, and/or subscribed to by the energy management system. In another example, the tunneling protocol may permit the network content to be obtained and/or instructions to be sent by the energy management system via a messaging service and/or in response to a query. A particular tunneling protocol may be used that permits communications with the smart grid devices via a tunnel that penetrates the firewall in a manner that does not disrupt the integrity of the firewall and/or the smart grid devices.

An operation to determine whether a device condition exists may be performed by the energy management system. For example, the energy management system may communicate with the smart grid network to receive network content. The energy management system may communicate with the smart grid network using control-layer protocols (e.g., a building automation and control (BAC) and/or other control-layer protocols) and/or a tunneling protocol (e.g., an extensible messaging and presence protocol (XMPP) and/or other tunneling protocols) that permit the energy management system to obtain network content from the smart grid devices (e.g., a publisher/subscriber service, by querying one or more smart grid devices, by receiving streaming media, via a discovery service, via a messaging service, etc.). In one example, the energy management system may detect a smart grid device, or a set of smart grid devices, that is consuming power at a rate that exceeds a threshold (e.g., a threshold identified in the device inventory), and may determine that a condition associated with the smart grid device and/or the smart grid network exists. The energy management system may send a notification to a user device indicating that a condition exists. For example, the energy application may send a notification directly to a user device. In another example, the energy application may use a social networking website (e.g., Google Wave®, Twitter®, Facebook®, Myspace®, Internet-based open text forums, a blog, etc.) to send the notification. In yet another example, a notification may be received by a user device when the user device discovers content (e.g., a notification and/or other network content) associated with the smart grid network (e.g., via a discovery service, via a publisher/subscriber service, and/or via a search performed using a search engine, etc.).

A curtailment operation may be performed by the energy management system. For example, the energy management system may receive network content, in a manner similar to that described above and may determine that a curtailment condition exists when the power consumption, associated with the smart grid network, exceeds a threshold (e.g., the threshold established by the consumption profile). The energy management system may, based on the determination, send an instruction to a device controller server (e.g., as shown in FIG. 1) to perform an operation to reduce the rate of power consumption by the smart grid network. Additionally, the energy management system may send a notification, in a manner described above, to a user device indicating that a curtailment operation is being performed.

An operation to utilize unforced capacity may be performed by the energy management system. For example, the energy management system may receive network content in a manner similar to that described above and may determine that an operation to utilize unforced capacity may be performed when the rate of power consumption, associated with the smart grid network is below a threshold or above another threshold. In another example, the energy management system may determine that an operation to recharge and/or to replenish unforced capacity may be performed when the rate of power consumption, associated with the smart grid network, is below a threshold and/or a charge level associated with one or more smart grid devices is below a charge threshold. The energy management system may send an instruction to a device controller server (e.g., as shown in FIG. 1) to perform an operation for the smart grid network to utilize unforced capacity and/or to replenish unforced capacity, and/or may send a notification to a user device, in a manner similar to that described above, indicating that the operation to use and/or replenish unforced capacity is being performed.

A demand-response operation may be performed by the energy management system. For example, the energy management system may receive a demand-response (DR) request (e.g., a request to reduce demand on a power grid) from a power generation utility associated with a power grid from which the smart grid network receives power. The energy management system may determine, in response to the DR request, whether a curtailment operation and/or an operation to utilize unforced capacity may be performed.

The energy management system may perform the curtailment operation if the rate at which power is being consumed by the smart grid network exceeds a threshold. Additionally, or alternatively, the energy management system may perform a curtailment operation, an operation to utilize unforced capacity, or some combination thereof, in response to the DR request. The energy management system may send an instruction to a device controller server to perform the curtailment operation and/or to perform the operation to utilize the unforced capacity. Additionally, for example, the energy management system may send a notification, in a manner similar to that described above, to a user device indicating that a curtailment operation and/or an operation to utilize unforced capacity is being performed in response to the DR request.

Figure 2:
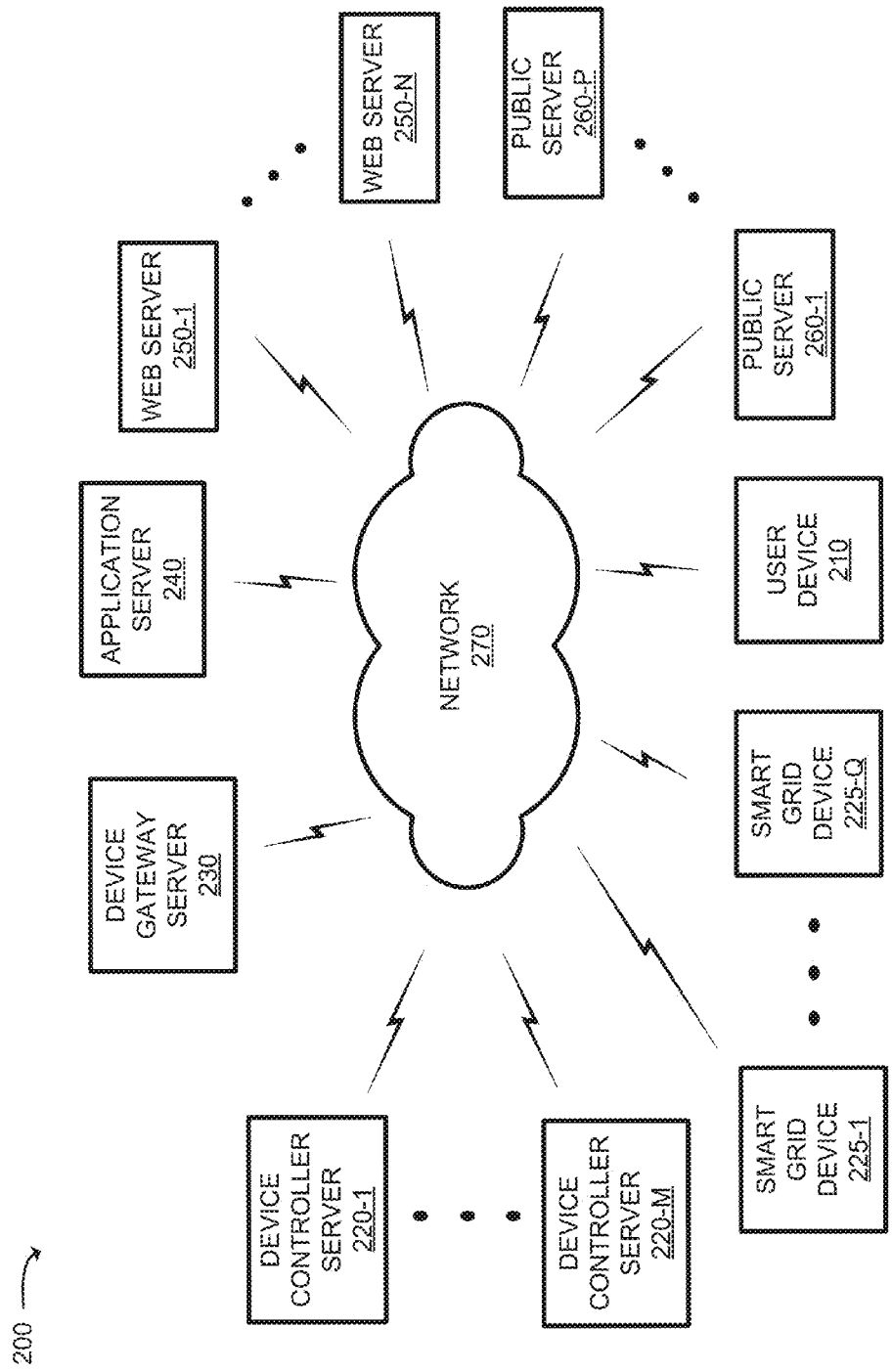
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a user device 210, a group of device controller servers 220-1, . . . , 220-M (where M≥1) (hereinafter referred to collectively as "device controller servers 220" and individually as "device controller server 220"), a group of smart grid devices 225-1, . . . , 225-Q (where Q≥1) (hereinafter referred to collectively as "smart grid devices 225" and individually as "smart grid device 225"), a device gateway server 230, an application server 240, a group of web servers 250-1, . . . , 250-N (where N≥1) (hereinafter referred to collectively as "web servers 250" and individually as "web server 250"), and a group of public servers 260-1, . . . , 260-P (where P≥1) (hereinafter referred to collectively as "public servers 260" and individually as "public server 260") interconnected by a network 270. The number of devices, illustrated in FIG. 2, is provided for explanatory purposes only. In practice, there may be additional devices, fewer devices, different devices, or differently arranged devices than illustrated in FIG. 2.

Also, in some implementations, one or more of the devices of network 200 may perform one or more functions described as being performed by another one or more of the devices of network 200. For example, device controller server 220, device gateway server 230, and/or application server 240 may be integrated into a single device. Devices of network 200 may interconnect via wired connections, wireless connections, or a combination of wired and wireless connections.

User device 210 may include any computation or communication device, such as a wireless mobile communication device that is capable of communicating via network 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device.

User device 210 may be associated with unique identification information that enables device gateway server 230, application server 240, web server 250, and/or public server 260 to distinguish user device 210 from other user devices 210. The user device identification information may include, for example, a private identifier (e.g., an international mobile subscriber identity (IMSI), a national access identifier (NAI), etc., a public identifier (e.g., a mobile device number (MDN), landline device number (LDN), mobile subscriber integrated services digital network (MSISDN), etc.), an Internet protocol (IP) address, etc.

User device 210 may communicate with other devices, associated with network 270, using short messaging service (SMS) protocols, IP protocols (e.g., TCP/IP, IPv4, IPv6, etc.), and/or other protocols. For example, user device 210 may send instructions to device gateway server 230 and/or application server 240 indicating that an operation, associated with a smart grid network (e.g., network 270 or some other network), is to be performed. In another example, user device 210 may discover information, associated with a smart grid network, by querying device gateway server 230 and/or application server 240 to receive information specified in the query. In yet another example, user device 210 may perform a search, via the Internet or some other network (e.g., network 270), to discover network content, associated with the smart grid network, that has been published as a web service to the Internet or some other network. In still another example, user device 210 may subscribe to a publisher/subscriber web service that permits user device 210 to receive information associated with the smart grid network that has been published (e.g., uploaded and/or able to be discovered by other devices on a network, such as network 270). In a further example, user device 210 may receive notifications from and/or send instructions directly to device gateway server 230 and/or application server 240, and/or via social networking web sites that includes messaging services (e.g., Google Wave®, Twitter®, Facebook®, Myspace®, Internet-based open text forums, a blog, etc.) that may be hosted by web servers 230.

Device controller server 220 may include one or more server devices, or other types of computation or communication devices, that gather, process, search, store, and/or provide information in a manner similar to that described herein. For example, device controller s 220 may communicate with smart grid device 225 and/or a set of smart grid devices 225 associated with a smart grid network (e.g., network 270). Device controller server 220 may, for example, monitor and/or control smart grid device 225.

Device controller server 220 may perform monitoring operations. For example, device controller server 220 may receive, from a particular smart grid device 225, information that includes an amount of power that the particular smart grid device 225 is consuming. In another example, device controller server 220 may receive information, from smart grid device 225, indicating a particular state associated with smart grid device 225 (e.g., whether a device is on, off, in standby mode, performing a particular function, malfunctioning, etc.). In yet another example, device controller server 220 may receive, from a particular smart grid device 225, information associated with environmental conditions (e.g., temperature, humidity, whether there is motion, whether a door is open or closed, whether there is an intrusion into the building and/or a computer system, an amount of power being consumed, etc.) in a building and/or a area within the building in which the particular smart grid device 225 is installed. Device controller server 220 may receive the information from smart grid device 225 and may send the received information to device gateway server 230.

Device controller server 220 may perform control operations. For example, device controller server 220 may receive an instruction from device gateway server 230 and may communicate with smart grid device 225, which may cause smart grid device 225 to perform a particular function. In one example, device controller server 220 may instruct smart grid device 225 to power down in response to an instruction, received from device gateway server 230, associated with a curtailment operation. In another example, device controller server 220 may instruct smart grid device 225 to switch from a power source connected to the power grid to another power source (e.g., a generator, a uninterruptible power supply (UPS), solar power, etc.) associated with an unforced capacity utilized by the smart grid network.

Smart grid device 225 may include any device, associated with smart grid network (e.g., network 270), that consumes power from a power grid and/or is capable of communicating with network 270. For example, smart grid device 225 may include a computer system (e.g., that includes a router, a server device, a workstation, a computer device, etc.), a telephone system (e.g., landline telephones, a private branch exchange (PBX), etc.), a wireless telephone, a STB, a television, a CCTV system, a camera, a personal gaming system, an appliance (e.g., a refrigerator, a stove, a vending machine, etc.). In another example, smart grid device 225 may include a device associated with unforced capacity of a smart grid network, such as a power generation device (e.g., a generator, a wind power device, a solar power device, etc.) and/or a power storage device (e.g., a bank of batteries, a UPS, etc.). In yet another example, smart grid device 225 may include a thermostat, a sensor (e.g., a motion detector, a door sensor/alarm, a smoke detector, etc.), an air handler, an HVAC system, a building security system, a fire alarm, a thermometer, a device to measure humidity (e.g., a psychrometer, a hygrometer, etc.), a light and/or lighting system, a power panel, etc. and/or any other device that may be associated with a smart grid network.

Device gateway server 230 may include one or more server devices, or other types of computation or communication devices, that gather, process, search, store, and/or provide information in a manner similar to that described herein. For example, device gateway server may include a server device that contains a communication interface that receives network content from smart grid devices 225, (e.g., via device controller server 220 or set of device controller servers 220), processes the network content (e.g., by performing protocol-layer translations), and/or sends the processed network content to application server 240. In another example, the communication interface may receive an instruction, associated with a particular smart grid device 225, from application server 240, may process the instruction, and/or may forward the instruction to the particular smart grid device 225.

Device gateway server 230 may perform monitoring operations. For example, device gateway server 230 may receive information from smart grid device 225 (e.g., via device controller server 220) and may, using the communication interface, process the received information (e.g., by converting the received information from a control-layer protocol to another protocol). In one example, device gateway server 230 may send the processed information to application server 240 in the form of a message that contains the processed information (e.g., using an IP-based protocol and/or some other protocol). In another example, device gateway server 230 may send, via a tunneling protocol (e.g., XMPP and/or some other tunneling protocol), the processed information to application server 240 in the form of a web service sing protocols such as hypertext transfer protocol (HTTP), extensible markup language (XML), simple object access protocol (SOAP), JavaScript Object Notation (JSON), etc.), and/or a combination of web services (e.g., sometimes referred to as a "mashup" and/or "service-oriented architecture" (SOA)), In yet another example, device gateway server 230 may present processed information to the smart grid network using a web service, such as a service discovery service (e.g., using XMPP extension XEP-030 and/or some other protocol) that may be discovered by application server 240 (e.g., by performing a search, etc.). In still another example, device gateway server 230 may publish processed information to the smart grid network using a web service, such as a publisher/subscriber service (e.g., using XMPP extension XEP-060 and/or some other protocol) that may permit application server 240 to receive updates periodically and/or upon the occurrence of some event.

Device gateway server 230 may perform control operations. For example, device gateway server 230 may receive an instruction from application server 240 and/or user device 210 and may, using the communication interface, translate the instruction into a control-layer protocol (e.g., a BAC protocol and/or some other control-layer protocol) that can be received and/or processed by device controller server 220. Device gateway server 230 may, for example, receive an instruction, from application server 240, regarding a condition associated with smart grid device 225, which indicates that smart grid device 225 is to be powered down for repair due to excessive power consumption detected by application server 240. The communication interface may convert the received instruction into a control-layer protocol and may send the processed instruction to device controller server 220 to initiate the power down operation.

Application server 240 may include one or more server devices, or other types of computation or communication devices, that gather, process, search, store, and/or provide information in a manner similar to that described herein. For example, application server 240 may include a server device that hosts an energy application that performs operations associated with remote energy management. Additionally, or alternatively, application server 240 may include, for example, a server device that stores (e.g., in a memory associated with application server 240) an application program interface (API) and/or a collection of APIs that enable application server 240 to communicate with different components of network 200, such as device gateway server 230, device controller server 220, smart grid devices 225, and/or other network devices (e.g., using a variety of device-specific applications and/or data formats/structures).

For example, application server 240 may, via device gateway server 230, receive network content associated with smart grid device 225 and may use a particular API to convert the receive network content into a normalized data format and/or data structure (hereinafter referred to as "data format/structure") that permits the energy application to receive and/or process the network content. In another example, the energy application may generate an instruction intended for smart grid devices 225 and may use an API to convert the instruction into a device-specific data format/structure, or a set of device-specific data formats/structures, that device gateway server 230 can process and/or send to smart grid device 225 (e.g., via device controller server 220).

In another implementation, all or a portion of the APIs, described as being stored in a memory associated with application server 240, may be stored in a memory associated with another network device. For example, device gateway server 230 and/or device controller server 220 may use an API to process instructions, network content, and/or other information in a manner similar to that described above.

Application server 240 may perform a set up operation. For example, the energy application may present a UI, via which physical attributes of a building (e.g., floor space, a quantity of floors, floor space usage, etc.) and/or information associated with devices to be installed in the building (e.g., smart grid devices 225) may be received. The energy application may use the received information to establish a set of energy management policies and/or thresholds which may be used to permit the energy application to remotely manage the power consumption associated with the devices installed in the building. In one implementation, the energy application may perform an operation that permits all or a portion of smart grid devices 225 to register with the application server 240, via device controller server 220 and/or device gateway server 230, using a tunneling protocol that enables the energy application to establish a publisher/subscriber web service (e.g., using XMPP XEP-60) and/or a service discovery service (e.g., using XMPP XEP-30), via which network content from smart grid devices 225 may be obtained.

In one example, application server 240 may receive and/or discover network content from device gateway server 230 and may use an API, or set of APIs, to process the network content. The energy application may receive the processed network content and may detect that a condition, associated with smart grid device 225, or a set of smart grid devices 225, exists (e.g., when power consumption exceeds a threshold associated with established energy management policies, if instructions are not being responded to, if a malfunction status indicator is received, etc.). In this example, application server 240 may send an instruction to device gateway server 230 to remedy the condition. In other examples, application server 240 may receive network content from device gateway server 230 and the energy application may send other instructions to device gateway server 230, based on the established energy management policies and/or thresholds, which may cause a curtailment operation and/or other operations to be performed that are associated with remote energy management.

In another example, application server 240 may receive network content associated with smart grid devices 225, via device gateway server 230, and may, based on established energy management policies, detect a curtailment condition associated with the smart grid network (e.g., network 270), such as excessive power consumption (e.g., above a threshold). In still another example, application server 240 may receive network content indicating the existence of other conditions, such as an unauthorized building intrusion, an intrusion into a computer system, device malfunctions, a fire and/or building alarm, etc. The energy application may, for example, send a notification associated with the detected condition to user device 210 (e.g., via instant message, email, voicemail, telephone call, a message via a social networking website, etc.).

In a further example, application server 240 may receive information associated with historical weather information and/or forecasted weather information and the energy application may perform an operation associated with remote energy management using the received information. For example, if unseasonably cold temperatures are forecasted, the energy application may cause certain areas of a building to be warmed to prevent pipes from freezing. If inclement weather is forecast, the energy application may cause particular smart grid devices 225 that are storage devices (e.g., battery packs, UPS devices and/or other storage devices) to be charged in the event of a power outage and/or may send a notification to user device 210 indicating that additional fuel is to be supplied to a generator in anticipation of the forecasted inclement weather. Application server 240 may also communicate with a power generation utility to settle a bill and/or to transmit power, generated by the smart grid network (e.g., network 270) to the power grid.

Web server 250 may include one or more server devices, or other types of computation or communication devices, that gather, process, search, store, and/or provide information in a manner similar to that described herein. For example, web server 250 may host a website that hosts a social networking website and/or permits access to a social networking service that may be used to send notifications, associated with a smart grid network, to user device 210 and/or to receive instructions, from user device 210, that a be received and/or processed by application server 240. In another example, web server 250 may provide information associated with weather forecasts, historical weather information, information associated with energy prices, and/or historical data associated with energy consumption and/or prices.

Public server 260 may include one or more server devices, or other types of computation or communication devices, that gather, process, search, store, and/or provide information in a manner similar in that described herein. For example, public server 260 may host a website and/or provide a service that permits access to a power generation utility from which the smart grid network received power, a regional transmission organization, and/or local, state, and/or federal regulators (e.g., energy, environmental, etc.).

Network 270 may include one or more wired and/or wireless networks. For example, network 270 may be a smart grid network and/or a network based on smart grid technology and/or other technologies that may include a cellular network, the Public Land Mobile Network (PLMN), and/or a second generation (2G), a third generation (3G), a fourth generation (4G), a fifth generation (5G) and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network (e.g., a fiber optic service (FiOS) network), and/or a combination of these or other types of networks.

Although not shown in FIG. 2, network 200 may include a variety of other devices, such as an authentication server, a self-provisioning server, etc. Each of these devices may perform certain functions described briefly below. Any of these functions may be performed by device controller server 220, device gateway server 230, and/or application server 240. Thus, one or more of these devices may be integrated into device controller server 220, device gateway server 230, and/or application server 240.

The authentication server may include one or more server devices, or other types of computation or communication devices, that authenticates user device 210. For example, the authentication server may receive a request to authenticate user device 210 based on information associated with a user of user device 210 (e.g., username, password, email address, PIN, etc.), and/or information associated with user device 210 (e.g., an identifier associated with user device 210).

The self-pro-visioning server may include one or more server devices, or other types of computation or communication devices that enable the registration of user device 210. The self-provisioning server may receive registration information from user device 210. The self-provisioning server may facilitate sending address information, associated with application server 240 and/or device gateway server 230, to user device 210 and/or may forward identification information, associated with user device 210, to application server 240, device gateway server 230 and/or other devices.

Figure 3:
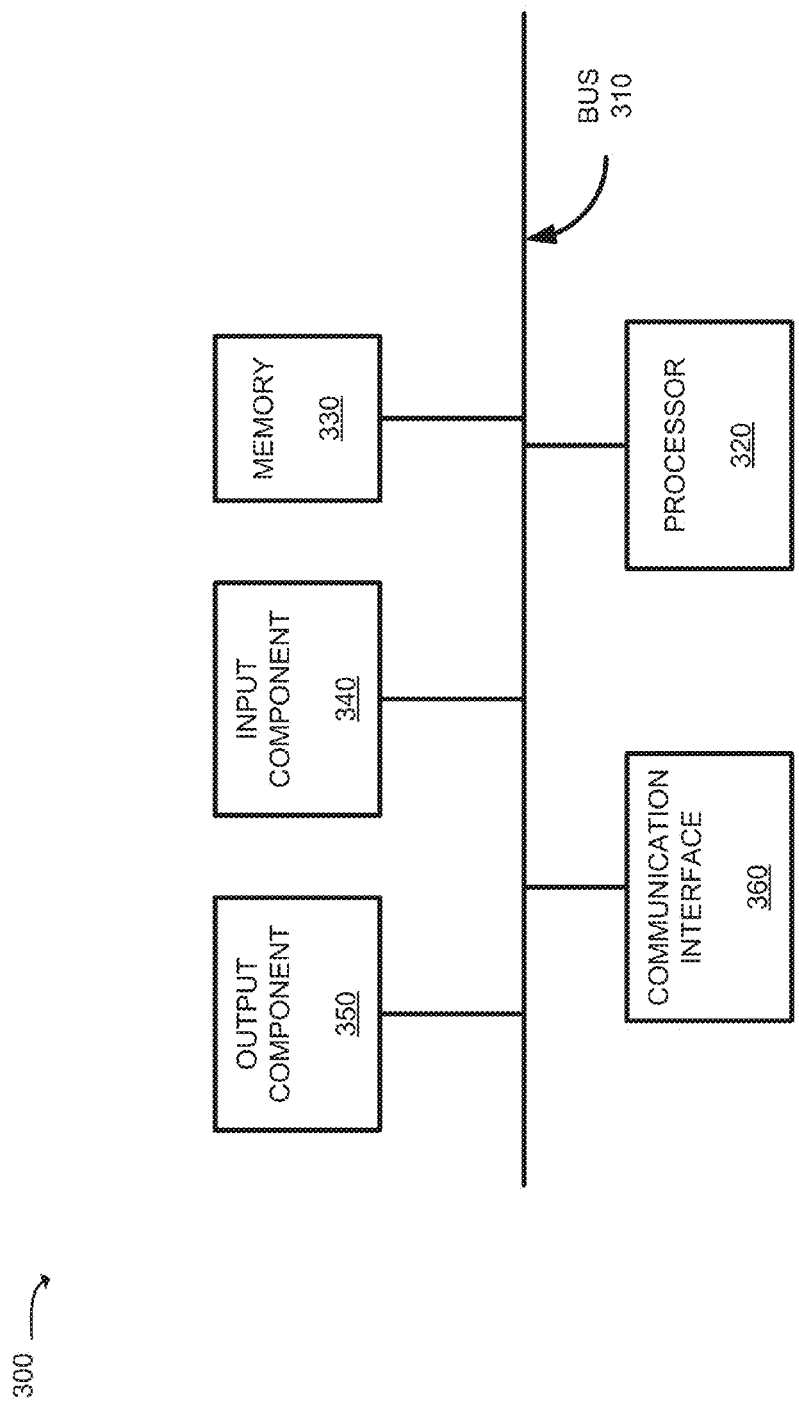
FIG. 3 is a diagram of example components of one or more of the devices of FIG. 2.

FIG. 3 is a diagram of example components of a device 300. Device 300 may correspond to device controller server 220, device gateway server 230, application server 240, web server 250, and/or public server 260. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 270.

As will be described in detail below, device 300 may perform certain operations relating to remote energy management. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
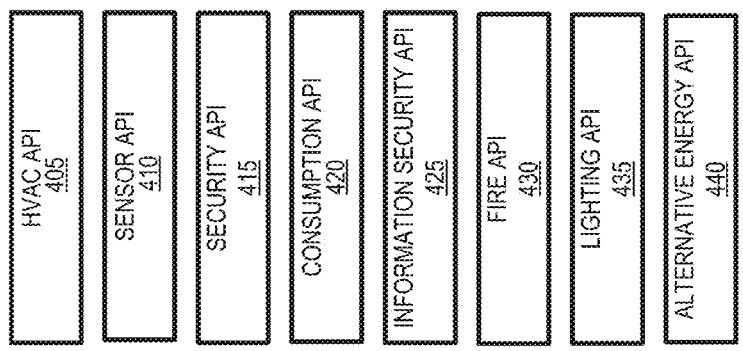
FIG. 4 is a diagram of example functional components associated with an application server device gateway server of FIG. 2.

FIG. 4 is a diagram of example functional components that may be associated with application server 240 of FIG. 2. As illustrated, application server 240 may include a heating, ventilation, and air conditioning (HVAC) API 405, a sensor API 410, a security API 415, a consumption API 420, an information security API 425, a fire API 430, a lighting API 435, and/or an alternative energy API 440. The functional components, illustrated in FIG. 4, are provided for explanatory purposes only. In practice, application server 240 may include fewer functional components, additional functional components, different functional components, or differently arranged functional components than are described with respect to FIG. 4. Moreover, one or more APIs in FIG. 4 may perform one or more functions described as being performed by another one or more of the APIs of FIG. 4. Also, the functional components in FIG. 4 may be implemented using one or more of the components of device 300 (FIG. 3), such as processor 320. In another example implementation, all or a portion of the functional components in FIG. 4 may be implemented in other devices of network 200 (FIG. 2), such as device gateway server 230 and/or device controller server 220.

APIs 405-440 may perform application-layer and/or data-layer translations on instructions sent by the energy application and/or on network content received from smart grid devices 225 (e.g., via device controller server 220 and/or device gateway server 230). For example APIs 405-440 may receive an instruction (e.g., from the energy application) based on a particular data format and/or structure (e.g., a normalized data format/structure). APIs 405-440 may, for example, translate the instruction from the normalized data format/structure to a data format, or a set of data formats, that may be received and/or processed by smart grid devices 225 and/or other network devices (e.g., device controller server 220 and/or device gateway server 230). In another example, APIs 405-440 may receive network content based on a variety of data formats/structures associated with smart grid devices 225 and may process the network content. APIs 405-440 may, for example, translate the network content into a normalized data format/structure that may be received and/or processed by the application serer.

For example, HVAC API 405 may process (e.g., translate between control layer protocols and/or IP based protocols) instructions and/or network content associated with a particular smart grid device 225 corresponding to an HVAC system (e.g., that may include an air handler, a heat pump, an air conditioner, a thermostat, etc.). Sensor API 410 may, for example, process instructions and/or network content associated with another smart grid device 225 corresponding to a sensor or collection of sensors (e.g., that may include a thermometer, a hydrometer, a motion detector, a light sensor, etc.). Security API 415 may, for example, process instructions and/or network content associated with yet another smart grid device 225 corresponding to a security system (e.g., that may include sensors to indicate whether doors are opened, closed, and/or locked; card readers; motion detectors; intrusion detectors; video cameras; etc).

Consumption API 420 may, for example, process instructions and/or network content associated with a smart grid device 225 that corresponds to a device that measures a quantity of power consumed and/or a rate of power consumption (e.g., a power meter or some other power measuring device). Information security API 425 may, for example, process instructions and/or network content associated with a smart grid device 225 that corresponds to information received from an application on a computer system that indicates whether or not the computer system is turned on, secure (e.g., an anti-virus application, an application that has intrusion detection capability and/or sends alerts when a cyber attack and/or other act is detected), etc.

Fire API 430 may, for example, process instructions and/or network content associated with another smart grid device 225 that corresponds to a fire detection/suppression system (e.g., that may include smoke detectors, fire detectors, fire alarms, communications devices that alert first responders and/or tire suppression devices, such as sprinklers and/or inert gas suppression devices, etc.). Lighting API 435 may, for example, process instructions and/or network content associated with yet another smart grid device 225 that corresponds to a lighting system (e.g., that may include lights, light switches, light detectors, etc.). Alternative energy API 440 may, for example, process instructions and/or network content associated with still another smart grid device 225 that corresponds to devices associated with unforced capacity (e.g., power storage and/or generation devices, such a battery bank, UPS, generators, solar devices, wind devices, etc.).

In another example implementation, all or a portion of APIs 405-440 may perform protocol-layer translations in a manner similar to that described above with respect to the communication interface associated with device gateway server 230 of FIG. 2.

Figure 5:
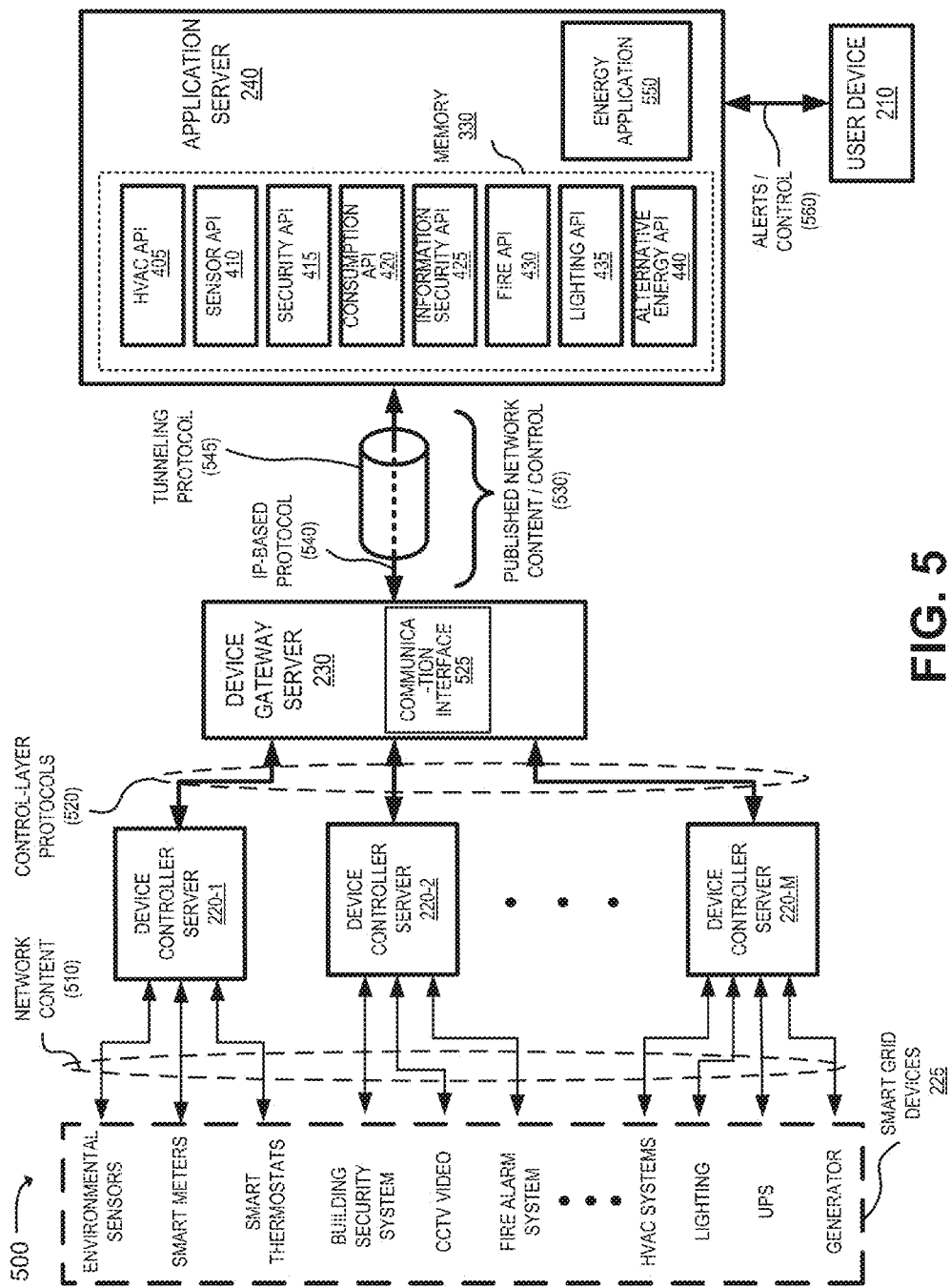
FIG. 5 is a diagram of an example interactions between a user device, device controller servers, smart grid devices, a device gateway server, and an application server of FIG. 2.

FIG. 5 is a diagram of example interactions 500 between user device 210, device controller servers 220, smart grid devices 225, device gateway server 230, and application server 240 of FIG. 2. As illustrated in FIG. 5, device controller server 220 may receive network content 510 from smart grid devices 225 and may send network content 510 to device gateway server 230 using control-layer protocols 520 (e.g., BAC and/or some other protocol). For example, device gateway server 230 may receive network content 510 (e.g., from device controller server 220) on a periodic basis, upon the occurrence of some event, and/or in response to a query, via one or more of the APIs described above with respect to FIG. 4. Network content 510 may include a state associated with smart grid devices 225 (e.g., on, off, standing by, performing some function, malfunctioning, etc.), a quantity of power consumed for all or a portion of smart grid devices 225, environmental conditions of a building in which all or a portion of smart devices 225 are installed (e.g., temperature, humidity, etc.), whether the building is secure, whether smoke and/or tire are detected, whether lights are on or off, etc.

Device gateway server 230 may receive network content 510 and may process received network content 510, using communication interface 525. For example, communication interface 525 may translate network content 510, received from device controller servers 220, from a control-layer protocol associated with smart grid devices 225 (e.g., such as BAC and/or some other protocol) to an IP-based protocol (e.g., SOAP, HTTP, XML, etc., shown as IP-based protocol 540). The translated network content 510 may be received by application server 240 via a tunnel (e.g., using a tunneling protocol 545, such as XMPP and/or some other tunneling protocol) that permits network content 510 to be transmitted (e.g., as a text message, an email, a media stream, a call, etc.) in a secure manner to remote devices (e.g., application server 240 and/or user devices 210) and/or via firewalls associated with a facility in which device gateway server 230, device controller servers 220, and/or smart grid devices 225 are located.

In another example, communication interface 525 may publish the translated network content 510 using a publisher/subscriber web service, hosted by application server 240 (e.g., using an XMPP extension, such as XEP-060 and/or some other protocol), which enables application server 240 to receive the published network content (e.g., shown as published network content/control 530) by subscribing to the publisher/subscriber service yet another example, communication interface 525 may use a service discovery web service (e.g., using an XMPP extension, such as XEP-030, and/or some other protocol), hosted by application server 240, which may enable network content 510 to persist as web service that may be discovered by application server 240 using the service discovery web service.

Application server 240 may receive network content 510, and an energy application 550 (e.g., of application server 240) may use the received network content 510 to perform operations associated with remote energy management. For example, energy application 550 may obtain network content published network content/control 530) from device gateway server 230 (e.g., as a message, an email, as a data stream, by subscribing to a web service, by performing a search, as a communication received from a server device associated with asocial networking service, etc.) and may use one or more APIs (e.g., APIs 405-440) to translate the network content into a normalized data format/structure that may be received and/or processed by energy application 550. Energy application 550 may receive the translated network content and may perform an operation associated with remote energy management. For example, energy application 550 may send a notification to user device 210 (e.g., shown as alerts/control 560) when a condition is detected (e.g., a device condition, a curtailment condition etc.), when a demand-response request is received and/or upon the occurrence of some event.

In another example, application server 240 may receive an instruction from user device 210 (e.g., also shown as alerts/control 560), and energy application 550 may use all or a portion of APIs 405-440, to convert the instruction from a normalized data format/structure to a device-specific data format/structure, or a set of device-specific data formats/structures, that may be received and/or processed by smart grid devices 225. Additionally, or alternatively, energy application 550 may send, using the tunneling protocol (e.g., tunneling protocol 545), the instruction to device gateway server 230, as published network content/control 530 (e.g., using IP-based protocols 540). Device gateway server 230 may receive the instruction (e.g., as a message, an email, as a data stream, by subscribing to a web service, by performing a search, from a social networking service associated with a server device, etc.), may process the instruction using communication interface 525 (e.g., by translating the instruction from IP-based protocol 540 to control-layer protocol 520), and/or may send the instruction to one or more of device controller servers 220 to initiate an operation associated with the instruction.

Figure 6:
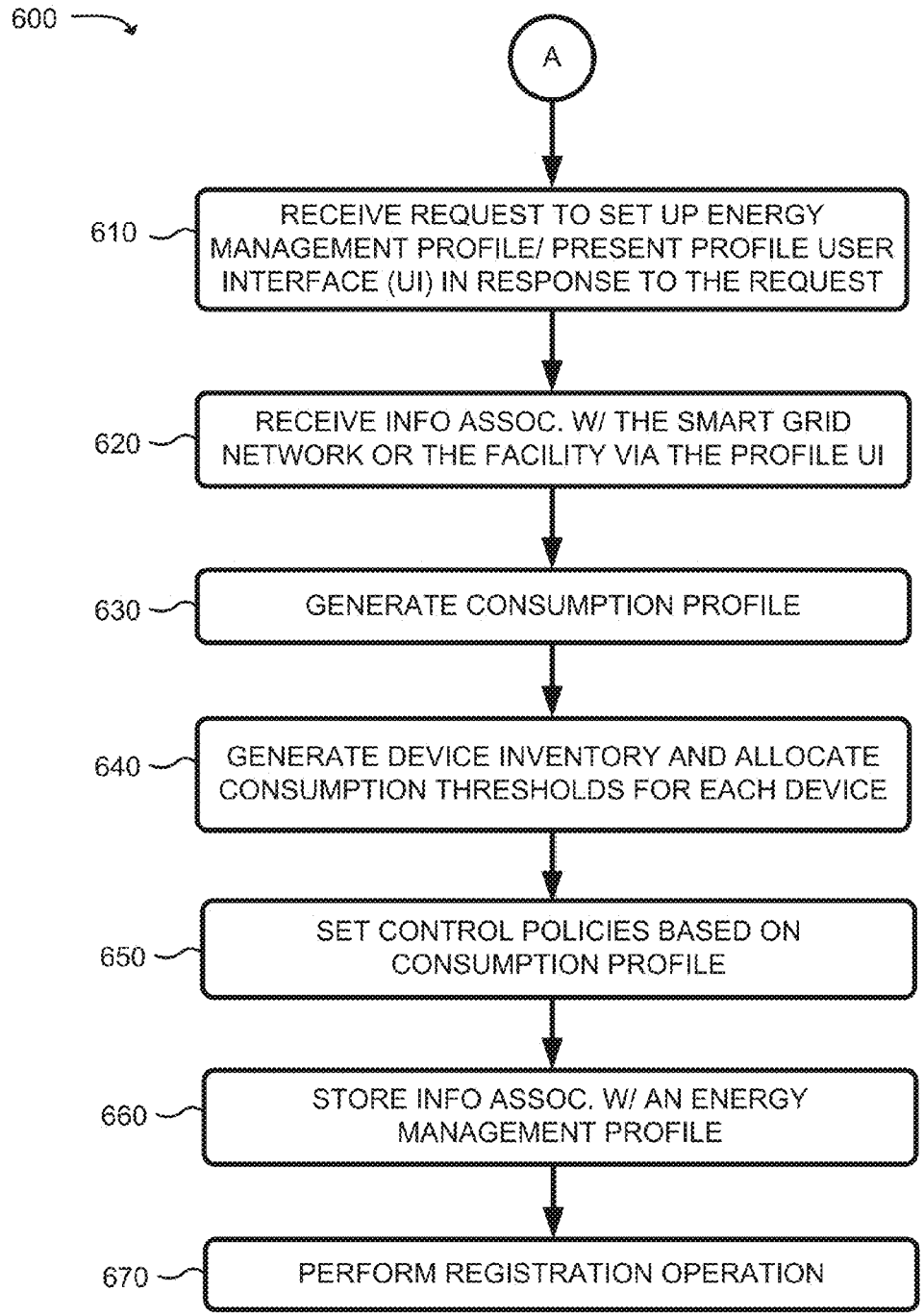
FIG. 6 is a flowchart of an example process for setting up an energy management profile.
Figure 7:
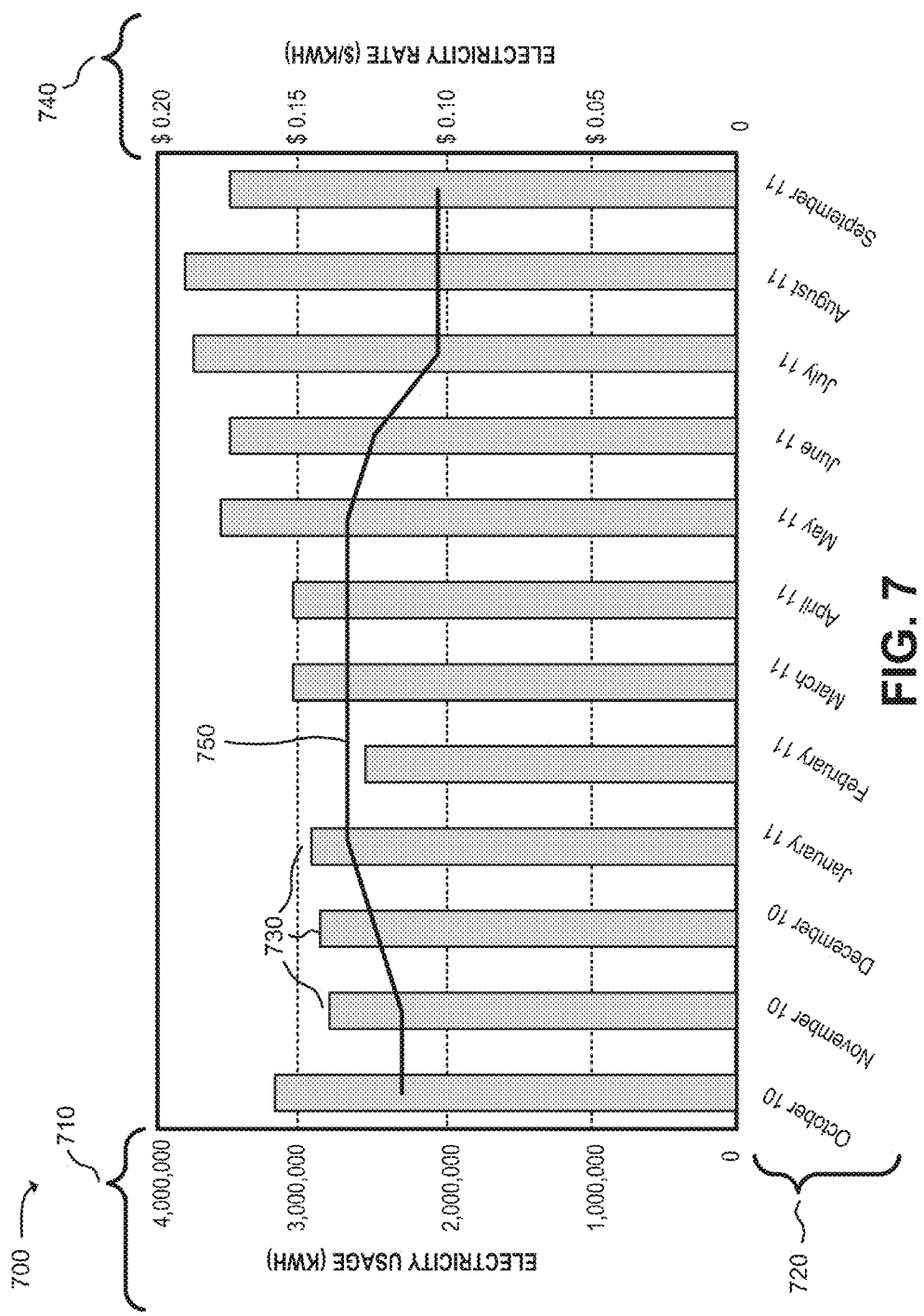
FIG. 7 is a diagram of an example consumption profile.

FIG. 6 is a flowchart of an example process 600 for setting up an energy management profile. In one implementation, process 600 may be performed by application server 240. In another implementation, some or all of process 600 may be performed by a device or collection of devices separate from, or in combination with, application server 240. FIG. 7 is a diagram of example consumption profile 700. A portion of process 600, of FIG. 6, will be discussed below with corresponding references to consumption profile 700 shown in FIG. 7.

As shown in FIG. 6, process 600 may include receiving a request to set up an energy management profile and presenting a profile user interface in response to the request (block 610). For example, application server 240 may receive a request, from user device 210, to set up an energy management profile for a smart grid network associated with a particular facility (e.g., an office building, a warehouse, and/or some other building). Application server 240 may receive the request and energy application (e.g., energy application 550) may present, for display on user device 210, a profile user interface (UI), via which information associated with the energy management profile may be received.

As shown in FIG. 6, process 600 may further include receiving information associated with the smart grid network or the facility via the profile UI (block 620). For example, a user of user device 210 may enter information associated with the physical characteristics of the facility, such as total square feet, a quantity of floors, square footage per floor, the manner in which the total square feet is apportioned (e.g., administrative space, storage space, vacant space, special uses space, such as a computer room, a laboratory, etc.), insulation properties associate with the facility, etc. In another example, information regarding devices (e.g., smart grid devices 225) associated with the facility may also be entered by the user of user device 210, which may include a type of device (e.g., an air handling device, a heating device, an air conditioning device, an appliance, a thermostat, controllers to control lights and/or other devices, security systems, power meters, thermostats, etc.), the power consumption ratings for each device, power storage and/or generation ratings for each device, a location associated with each device, etc.

In another example implementation, an energy management profile may be established in an automated manner. For example, the profile UI may include a set of facility characteristic templates from which the user (e.g., of user device 210) may choose to establish an energy profile. The facility characteristic templates may include physical characteristics of a facility or set of facilities, such as a type of facility (e.g., office building, warehouse, residence, etc.), a size of the facility (e.g., by square footage, volume, number of floors, etc.), layout of each floor associated with the facility (e.g., a quantity of rooms, common areas, etc., and/or a location and/or size of each room, etc.), apportioned usage of the facility (e.g., administrative, storage, vacant space, etc.), insulation properties of the facility, and/or other characteristics associated with the facility.

In one example, the user may select a particular facility characteristics template on which to set up the energy management profile by selecting a particular button on the profile UI using a pointing device (e.g., a mouse, a touch screen, etc.) and/or by pressing a button, or series of buttons, on a keyboard/keypad associated with user device 210. Energy application 550 may receive the selection and may, for example, automatically retrieve information associated with the facility characteristics corresponding to the selection. In another example, energy application 550 may automatically retrieve information regarding devices (e.g., smart grid devices 225) associated with the particular template and may automatically populate (e.g., pre-populate) the profile UI with the information regarding the devices. The information regarding devices may include the type and/or quantity of each device, the location within the facility of each device, consumption/storage/generation ratings for each device, and/or other information.

In another example, the user may edit the particular template, via the user profile, by tailoring the physical characteristics of the facility to which the template corresponds and/or of the information regarding the devices (e.g., smart grid devices 225) with which the template is associated. In one example, the user may, via the profile UI, change the size, layout, apportionment, insulation properties, and/or other characteristics of the facility. In another example, the user may, via the profile UI, edit the type and/or quantity of each device, the location within the facility for each device, the consumption/power/storage ratings for each device, and/or other information regarding the devices. The user may save the edited template as a new template and may use the new template and/or another template to automatically set up an energy management profile for another facility and/or set of facilities.

As further shown in FIG. 6, process 600 may include generating a consumption profile (block 630). For example, application server 240 may receive, via the profile UI, the information associated with the facility and energy application 550 may use the received information to generate a consumption profile consumption profile 700 of FIG. 7) based on the in information associated with the physical characteristics of the facility, as described above, and/or the power consumption, storage, and/or generation ratings for each device associated with the facility. In another example, energy application 550 may generate the consumption profile based on historical climate data corresponding to a particular location and/or region at which the facility is located (e.g., obtained from a memory associated with application server 240 and/or a weather service associated with web server 250). In yet another example, energy application 550 may generate the consumption profile based on historical electricity rates and/or projected electricity rates obtained, via web server 250 and/or public server 260, from a power generation utility from which the facility may draw power and/or from a regional transmission operator (RTO) responsible for setting rates.

In yet another example implementation, the user may specify, via the profile UI, the characteristics on which a consumption profile, associated a particular facility characteristics template, is to be based. For example, the user may specify whether the consumption profile, for the particular facility characteristics template, is to be based on historical climate data, historical electricity rates, projected electricity rates, historical power consumption data, etc.

As illustrated in FIG. 7, for example, consumption profile 700 may include a collection of data items, such as an electricity usage (KWH) scale 710, a time scale 720, a consumption quantity 730, an electricity rate ($/KWH) scale 740, and/or an electricity rate 750. While FIG. 7 illustrates consumption profile 700, that includes certain data items, such as data items 710-750, in another implementation, consumption profile 700 may include fewer data items, additional data items, different data items, or differently arranged data items than are described with respect to FIG. 7.

Electricity usage (KWH) scale 710 may include a scale that may be used to identify quantity of electricity consumed (e.g., in kilowatt-hours (KWH)). Time scale 720 may include a unit of time (e.g., yearly, monthly, semi-monthly, weekly, daily, etc.) throughout the course of a profile time period (e.g., a year or some other time period). Consumption quantity bars 730 may identify a quantity of electricity consumed for a particular unit of time. Electricity rate ($/KWH) scale 740 may identify a cost scale, per unit of electrical power (KW) and/or electrical energy (KWH) consumed, that may be used to identify a cost associated with a quantity of electricity consumed. Electricity rate 750 may identify a cost per unit of electricity for a particular unit of time. For example, as illustrated in FIG. 7, consumption quantity bar 730 that corresponds to November of 2010, may indicate that the facility is to consume no more than approximately 2,800,000 KWH of electricity at a cost of $378,000 (e.g., based on a forecasted electricity rate ($/KWH) 740 of $0.135 per KWH 750 for November 2009). In another example, as illustrated in FIG. 7, consumption quantity bar 730 that corresponds to August of 2011, may indicate that the facility is to consume no more than approximately 3,800,000 KWH of electricity at a cost of $399,000 (e.g., based on a forecasted electricity rate ($/KWH) 740 of approximately $0.105 per KWH 750 for August 2010).

In another example implementation, a cost profile may be generated that may, in a manner similar to that described above, indicate that the facility is not to expend more for electricity consumption than a particular cost threshold established for each unit of time over the course of a profile period (e.g., one year, two years, etc.).

Returning to FIG. 6, process 600 may include generating a device inventory and allocating consumption thresholds for each device (block 640). For example, energy application 550 may use the consumption profile to establish thresholds for each device (e.g., each smart grid device 225) associated with the facility. The threshold, established for each device, may be based on a power consumption rating and/or some margin relative to the consumption rating (e.g., 0%, 5%, 10%, 50%, etc.), associated with each device, which may indicate that a quantity of power consumed by the device is not to exceed the threshold. Energy application 550 may save the information associated with each device and received via the profile UI and/or the thresholds established for each device, as a device inventory, in a memory associated with application server 240.

In another example implementation, the user may edit a particular facility characteristic template in order to obtain a desired consumption profile. For example, the user may specify, via the profile UI used to establish the particular facility characteristic template, a desired consumption profile 700 (FIG. 7) and/or cost profile and energy application 550 may, for example, automatically generate a revised facility characteristics template and/or revised device thresholds in order to achieve the desired consumption profile 700. In one example, the revised facility characteristics template may include proposed changes to physical characteristics associated with the facility (e.g., by changing insulation properties based on alternative insulation technology and/or products). In another example, the revised facility characteristics template may include changes to the information regarding the devices (e.g., smartgrid devices 225) associated with the facility (e.g., changes to types of all or a portion of the devices to, for example, reduce projected power consumption associated with the facility). In yet another example, the user may manually change, via the profile UI, physical characteristics and/or information regarding the all or a portion of the devices and energy application 550 may automatically revise the consumption profile 700 based on the change. Energy application 550 may, based on the changes to the consumption profile 700, physical characteristics of the facility, and/or information associated with the devices, automatically revise consumption thresholds associated with each device.

As further shown in FIG. 6, process 600 may include setting control policies based on the consumption profile (block 650). For example, based on the consumption profile (e.g., consumption profile 700) and/or thresholds established for each device (e.g., each smart grid device 225) contained in the device inventory, energy application 550 may establish control policies associated with curtailment operations, unforced capacity operations, remedying device conditions, demand-response operations, and/or other operations. In one implementation, a control policy may be set that establishes when an operation to remedy a device condition is to be performed. For example, energy application 550 may establish a control policy that identifies a device condition for a particular device (e.g., smart grid device 225) when a quantity of power, being consumed by the device, is greater than the established threshold for the particular device. In another example, energy application 550 may establish a control policy that sends a notification to user device 210 when a device condition is detected and/or instructs the device, associated with the condition, to power down and/or to reduce power consumption if possible.

In another implementation, a control policy may be set that establishes when a curtailment operation and/or an unforced capacity operation are to be performed. For example, a control policy may be set that triggers a curtailment operation when a demand-response request is received from a power generation utility from which smart grid devices 225 receive power. In another example, a control policy may be set that triggers a curtailment operation when power consumption is high relative to the consumption profile e.g., consumption profile 700 (FIG. 7)). Energy application 550 may, for example, use the consumption profile to establish a threshold that may be used to determine whether to perform a curtailment operation. More particularly, energy application 550 may use the consumption profile to establish allocated thresholds (e.g., on a daily, hourly, and/or some other basis), which may depend on a rate structure provided by a power generation utility (e.g., via web server 240) from which the facility receives power. The rate structure may include definitions of peak time periods, non-peak time periods, and/or electricity rates (e.g., $/KWH) associated with the peak time period, non-peak time period, and/or other time periods. In one example, a curtailment operation may be triggered when instantaneous power consumption exceeds an allocated instantaneous curtailment threshold. In another example, a curtailment operation may be triggered when power consumption, over a particular period of time (e.g., 15 minutes, 30 minutes, 60 minutes, 2 hours, 6 hours, 1 day, etc.), exceeds an allocated curtailment threshold associated with the particular period of time.

In yet another example, a control policy may be set that triggers an operation to replenish unforced capacity when power consumption is low relative to the consumption profile. In this example, energy application 550 may use the consumption profile to establish an unforced capacity threshold below which an operation to replenish unforced capacity (e.g., by recharging a battery bank, UPS, and/or another storage device) and/or to contribute to the power grid (e.g., using an alternate power source, such as a generator device, a solar device, a storage device and/or some other device) pursuant to an agreement with a power generation utility and/or other entity. Therefore, in this example, an operation to replenish unforced capacity may be triggered when instantaneous power consumption is below an allocated instantaneous unforced capacity level. Another operation to replenish unforced capacity may be triggered, for example, when power consumption, over a particular period of time, is less than an allocated unforced capacity threshold associated with the period of time.

In one implementation, a control policy to establish the manner in which certain operations are to be performed may be established. For example, energy application 550 may establish a control policy that identifies which devices are to be powered back and/or powered off order to perform a curtailment operation, a demand-response operation, and/or an unforced capacity operation. Additionally, or alternatively, energy application 550 may establish preferred time profiles during which curtailment operations are performed (e.g., a particular percentage during non-working hours, another percentage during non-peak work hours, and yet another percentage during peak hours). In another example, energy application 550 may establish thresholds (e.g., reductions in power consumption above some aggressive threshold) that require approval from a user of user device 210, prior to operations being initiated to achieve the aggressive threshold. It should be understood that the policies described herein are provided for explanatory purposes and that, in practices, there may be additional policies, fewer policies and/or different policies than are described herein.

As further shown in FIG. 6, process 600 may also include storing information associated with an energy management profile (block 660). For example, information associated with an energy management profile may be stored in a memory associated with application server 240. The information, associated with the energy management profile, may include information associated with the physical characteristics of the facility, information associated with the device inventory, and/or information associated with the control policies.

As also shown in FIG. 6, process 600 may include performing a registration operation (block 670). For example, energy application 550 may perform a registration operation, using a protocol (e.g., an XMPP extension XEP-030 and/or some other tunneling protocol) via which network content (e.g., power consumption, device status, sensor readings, etc.), generated by each device (e.g., smart grid device 225), may be discovered via a discovery service. In another example, energy application 550 may perform the registration operation, using another protocol using an XMPP extension XEP-060 and/or some other tunneling protocol) via which the network content may be uploaded (e.g., published) using a publisher/subscriber service. In yet another example, the registration operation may permit the network content to be received by application server 240, via a tunnel (e.g., established using XMPP and/or some other tunneling protocol), in the form of an instant messaging, emit, social networking websites (e.g., via web server 250), and/or in response to a query from energy application 550.

In another example, user device 210 may register with application server 240 to receive notifications regarding operations associated with the smart grid network (e.g., network 270). The registration operation may include obtaining information associated with a user device 210 (e.g., MDN or LDN, an IP address, an MSISDN, etc.) and/or information associated with the user of user device 210 (e.g., username, password, personal identification operation, etc.), which may be used to authenticate and/or authorize user device 210 during operations and/or communications at future point in time. Additionally, or alternatively, the degree to which a user, of user device 210, is authorized to send instructions to energy application 550 may be set by a network administrator associated with network 270.

Figure 8A:
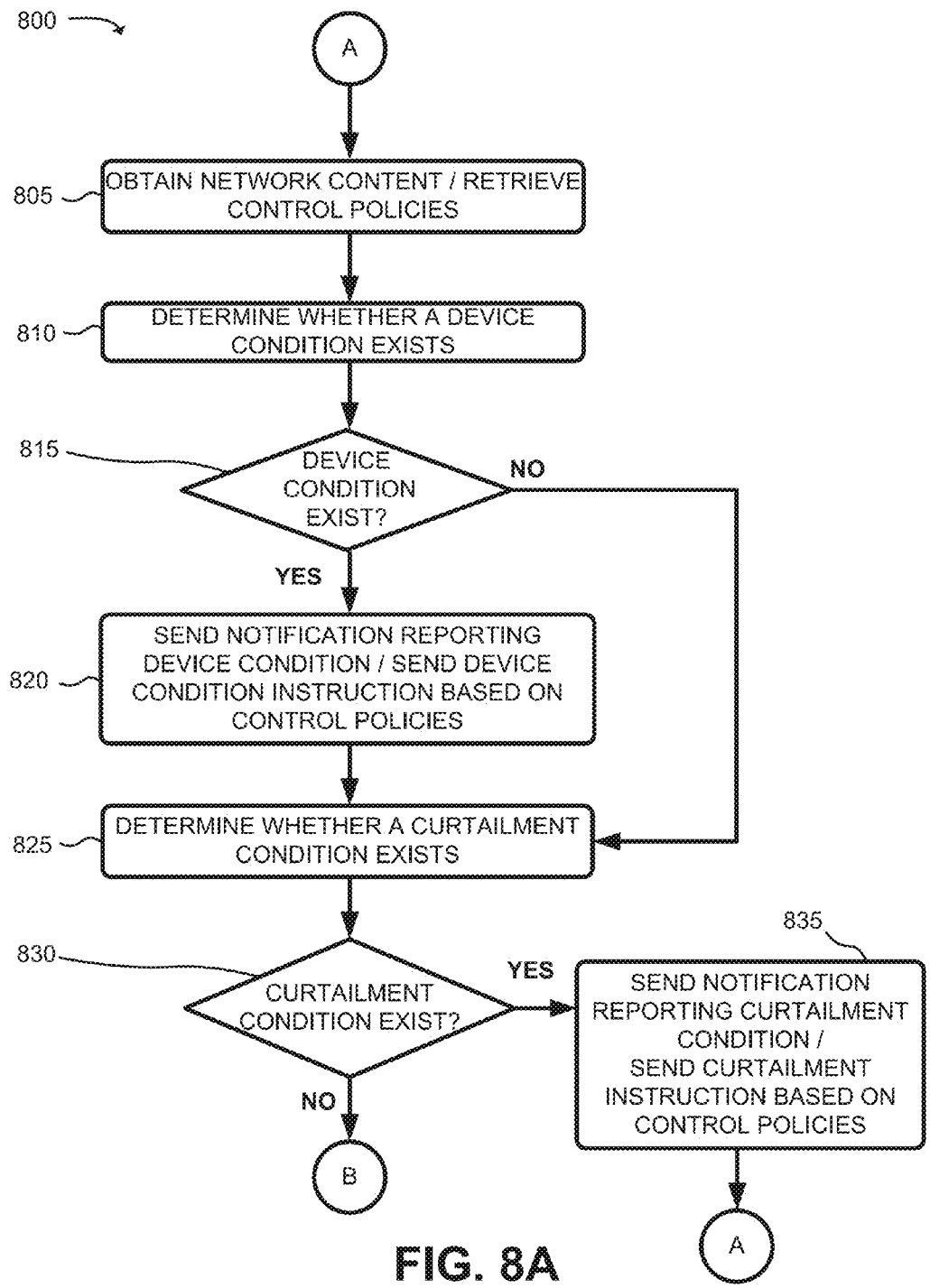
FIGS. 8A and 8B are flowcharts of an example process for a remote energy management operation.
Figure 8B:
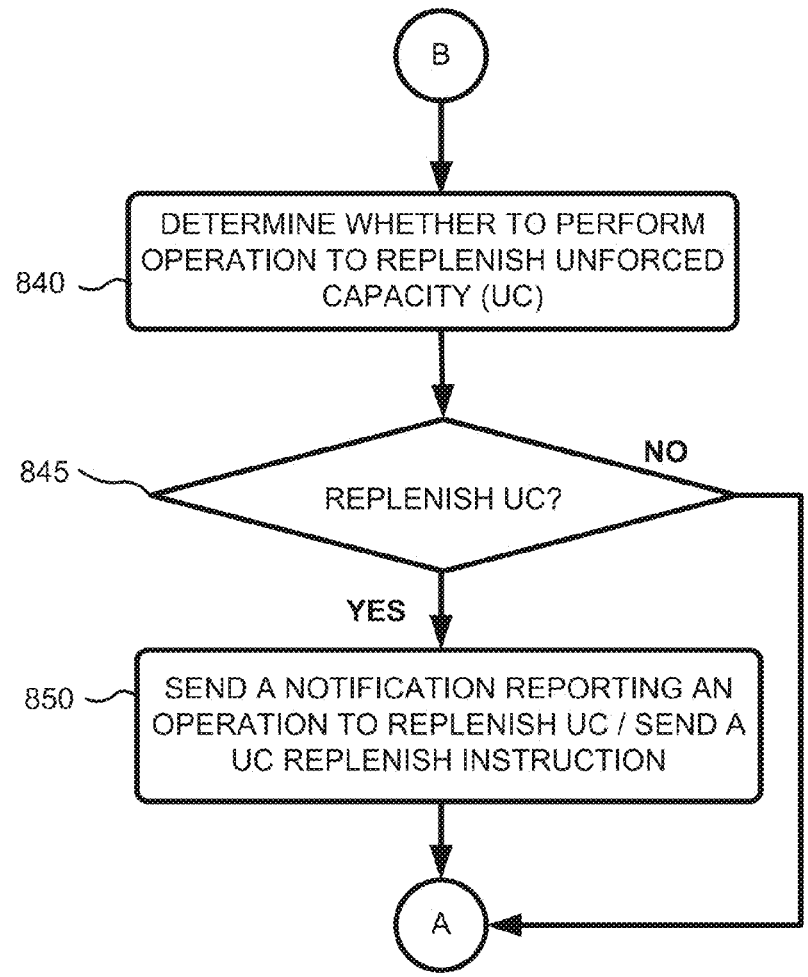

FIGS. 8A and 8B are a flowchart of an example process 800 for a remote energy management operation. In one implementation, process 800 may be performed by application server 240. In another implementation, some or all of process 800 may be performed by a device or collection of devices separate from, or in combination with, application server 240.

As shown in FIG. 8A, process 800 may include obtaining network content and retrieving control policies (block 805). For example, an energy application (e.g., energy application 550 of FIG. 5), hosted by application server 240, may obtain network context from device gateway server 230 and may retrieve control policies from a memory associated with application server 240. In one example, the network context may be received periodically, upon the occurrence of some event, and/or as a result of energy application 550 querying device gateway server 230 to retrieve network content from all or a portion of smart grid devices 225, via device controller server 220. In another example, the network content may be received, periodically and/or upon the occurrence of some event, via a publisher/subscriber web service. In yet another example, the network content may be obtained via a discovery service. Energy application 550 may obtain network content and may retrieve, from a memory associated with application 240, information associated with an energy profile that may include information associated with the physical characteristics of the facility, information associated with the device inventory, and/or information associated with the control policies.

As further shown in FIG. 8A, process 800 may include determining whether a device condition exists (block 810). For example, energy application 550 may receive network content and may determine whether a condition exists based on the received network content and/or the retrieved control policies. In one example, energy application 550 may determine whether a device condition exists by determining whether the received network content includes an indication that a smart grid device 225 is malfunctioning, offline, and/or is otherwise not available. In another example, energy application 550 may compare the received network content (e.g., power consumption) to thresholds associated with all or a portion of smart grid devices 225 included in the information associated with the device inventory.

As yet further shown in FIG. 8A, if a device condition exists (block 815—YES), a notification reporting the device condition may be sent and a device condition instruction may be sent based on the control policies (block 820). For example, energy application 550 may determine that an indication that smart grid device 225 is malfunctioning, offline, and/or is otherwise not available was included in the received network content. In another example, energy application 550 may determine that a device condition exists when the power consumption, associated with smart grid device 225, is greater than a threshold, associated with smart grid device 225 stored in the device inventory, by a particular quantity (e.g., 0%, 10%, 20%, 50%, or some other particular quantity).

In one example, energy application 550 may send a notification to user device 210 indicating that a device condition has been detected. The notification may be sent via an instant message, an email, posted to a website hosted by application server 240, and/or via a social networking service hosted by web server 250. Additionally, or alternatively, energy application 550 may, based on the control policies, send an instruction to device gateway server 230 to power back smart grid device 225 with which the device condition is associated. In another example, energy application may send an instruction to power off smart grid device 225. In yet another example, energy application 550 may send an instruction upon the occurrence of some event (e.g., upon the receipt of an instruction from user device 210). In still another example, energy application may automatically send an instruction (e.g., to power off and/or power down) without consulting the control policies. In a further example, energy application 550 may not send an instruction.

Returning to FIG. 8A, if a device condition does not exist (block 815—NO), or after block 820, then process 800 may include determining whether a curtailment condition exists (block 825). For example, energy application 550 may determine that an indication that smart grid device 225 is malfunctioning, offline, and/or is otherwise not available was not included in the received network content. Additionally, or alternatively, energy application 550 may, for example, determine that a device condition does not exist when the power consumption, associated with smart grid device 225, is less than or equal to a threshold, associated with smart grid device 225 stored in the device inventory.

In another example, energy application 550 may determine whether a curtailment condition exists by comparing the total instantaneous power consumed by smart grid devices 225, obtained from the network con to instantaneous total power consumption thresholds included in the control policies. In still another example, energy application 550 may retrieve, from a memory, information associated with total power consumption from a prior point in time and may determine whether a curtailment condition exists by comparing total power consumption over a period time (e.g., from the prior point in time to a present point in time) to total power consumption thresholds associated with the period of time included in the control policies.

As further shown in FIG. 8A, if a curtailment condition exists (block 830—YES), a notification reporting the curtailment condition may be sent and a curtailment instruction may be sent based on the control policies (835). For example, energy application 550 may determine that a curtailment condition exists when the total instantaneous power consumption is greater than an allocated instantaneous curtailment threshold identified in the control policies. In another example, energy application 550 may determine that a curtailment condition exists when the total power consumption, over a particular period of time, is greater than an allocated curtailment threshold, associated with the particular period of time, identified in the control policies.

In still another example, energy application 550 may, in a manner similar to that described above with respect to block 820, send a notification to user device 210 indicating that a curtailment condition has been detected. In one example, energy application 550 may, in a manner similar to that described above with respect to block 820 and based on the control policies, send an instruction to device gateway server 230 to power back (e.g., to reduce power consumption to a level that is less than or equal to the allocated instantaneous curtailment threshold) all or a portion of smart grid devices 225 to reduce total power consumption. In another example, energy application 550 may, based on the control policies, send an instruction to power all or a portion of smart grid device 225. In yet another example, energy application 550 may, based on the control policies, send an instruction to perform an operation to utilize unforced capacity that includes switching power sources from the power grid to a particular smart grid device 225, associated with unforced capacity, such as a power storage device (e.g., a battery bank device, a UPS device, and/or another power storage device) and/or a power generation device (e.g., a generator device, a solar power generation device, etc.). In another example, energy application 550 may, based on the control policies, send some combination instructions, such as powering back all or a portion of smart grid device 225, powering off all or a portion of smart grid device 225, and/or switching all or a portion of smart grid devices 225 from the power grid to a particular smart grid device 225 associated with unforced capacity.

The manner in which the instruction is sent may be based on the control policies. For example, energy application 550 may send a curtailment instruction upon the occurrence of some event (e.g., upon the receipt of an instruction from user device 210) and/or when the control policies indicate that the instruction may be sent. In another example, energy application 550 may automatically send the instruction (e.g., without consulting the control policies and/or without receiving an instruction from user device 210). In a yet another example, energy application 550 may schedule a curtailment operation at a future point in time and/or may schedule a set of curtailment operations at a set of future points in time to reduce power consumption to a level that is less than an allocated power consumption threshold.

As shown in FIGS. 8A and 8B, if a curtailment condition does not exist (block 830—NO) (FIG. 8A), or after block 830, process 800 may include determining whether to perform an operation to replenish unforced capacity (block 840) (FIG. 8B). For example, energy application 550 may determine that a curtailment condition does not exist when the total instantaneous power consumption is less than or equal to an allocated instantaneous curtailment threshold identified in the control policies. In another example, energy application 550 may determine that a curtailment condition does not exist when the total power consumption, over a particular period of time, is less than or equal to an allocated curtailment threshold, associated with the particular period of time, identified in the control policies.

Energy application 550 may determine whether to perform an operation to replenish unforced capacity by comparing the total instantaneous power consumed by smart grid devices 225, obtained from the network content, to an allocated instantaneous unforced capacity threshold included in the control policies. In another example, energy application 550 may retrieve, from a memory, information associated with total power consumption from a prior point in time and may determine whether to perform an operation to replenish unforced capacity by comparing total power consumption over a period time (e.g., from the prior point in time to a present point in time) to an allocated unforced capacity threshold, associated with the period of time, included in the control policies.

As further shown in FIG. 8B, if unforced capacity is to be replenished (block 845—YES), then a notification reporting that an operation to replenish unforced capacity is to be performed may be sent and an unforced capacity instruction may be sent (block 850). For example, energy application 550 may determine that an operation to replenish unforced capacity is to be performed when the total instantaneous power consumption is less than or equal to an allocated instantaneous unforced capacity threshold identified in the control policies. In another example, energy application 550 may determine that an operation to replenish unforced capacity is to be performed when the total power consumption, over a particular period of time, is less than or equal to an allocated unforced capacity threshold, associated with the particular period of time, identified in the control policies.

Energy application 550 may, in a manner similar to that described above with respect to block 820, send a notification to user device 210 indicating that an operation to replenish unforced capacity is to be performed. Additionally, or alternatively, energy application 550 may, in a manner similar to that described above with respect to block 820 and/or based on the control policies, send an unforced capacity replenish instruction to device gateway server 230 to perform an operation to replenish unforced capacity.

For example, energy application 550 may determine whether an available unforced capacity, associated with a quantity of power that may be provided by particular smart grid devices 225 (e.g., smart grid devices 225 associated with power storage and/or generation, such as a battery bank, a UPS, a generator, etc.), obtained from network content, is greater than an unforced capacity threshold (obtained from the control policies). In another example, energy application 550 may generate a query regarding whether an available unforced capacity is greater than the unforced capacity threshold, and may send the query to the particular smart grid devices 225 and/or device controller server 220 via device gateway server 230. In this example, energy application 550 may, in a manner similar to that described above with respect to block 820 (FIG. 8A), send an unforced capacity replenish instruction for the particular smart grid devices 225 to be replenished (e.g., particular smart grid devices 225 that store power, such as a battery bank device, a UPS device, and/or other power storage devices) based on a response to the query indicating that the available unforced capacity is not greater than the unforced capacity threshold. In another example, energy application 550 may send an unforced capacity replenish instruction for other unforced capacity devices (e.g., smart grid devices 225 associated with power storage and/or power generation, such as a generator, a solar power device, etc.) to generate, to send, and/or to otherwise contribute power to the power grid based on a response to the query indicating that the charge level, for the particular unforced capacity devices, are greater than the charge threshold.

As yet further shown in FIG. 8B, if unforced capacity is not to be replenished (block 845—NO), then other network content may be obtained and control policies may be retrieved (block 805) (FIG. 8A). For example, energy application 550 may determine that an operation to replenish unforced capacity operation is not to be performed when the total instantaneous power consumption is greater than an allocated instantaneous unforced capacity threshold identified in the control policies. In another example, energy application 550 may determine that an operation to replenish unforced capacity is not to be performed when the total power consumption, over a particular period of time, is greater than an allocated unforced capacity threshold, associated with the particular period of time, identified in the control policies. Energy application 550 may obtain other network context from device gateway server 230 and/or may retrieve control policies from a memory, associated with application server 240, to determine whether a device condition exists, whether a curtailment condition exists, and/or whether an unforced capacity operation is to be performed.

FIG. 9 is a flowchart of an example process 900 for performing a demand-response operation. In one implementation, process 900 may be performed by application server 240. In another implementation, some or all of process 900 may be performed by a device or collection of devices separate from, or in combination with, application server 240.

As shown in FIG. 9, process 900 may chide receiving a demand-response request and retrieving control policies (block 905). For example, application server 240 may receive a demand-response request (hereinafter, referred to as a "demand") from a power generation utility, associated with public server 260, from which the smart grid network (e.g., network 200) receives power. The demand may include an instruction to reduce power consumption by a demand quantity (e.g., in KWH) and/or by a demand percentage (e.g., as a percent of power consumption). An energy application, hosted by application server 240 (e.g., energy application 550), may retrieve control policies from a memory (e.g., a memory associated with application server 240) in response to the demand.

As further shown in FIG. 9, process 900 may include determining whether a curtailment operation can be performed in response to a demand (block 910). For example, energy application 550 may use network content, obtained from device gateway server 230, to determine the total instantaneous power consumption associated with smart devices 225. Energy application 550 may, for example, compare the total instantaneous power consumption with a curtailment threshold contained in the retrieved control policies to determine whether a curtailment operation, response to a demand, may be performed. In another example, energy application 550 may retrieve network content from a prior point in time and may compare the power consumption (e.g., total power consumption, average power consumption, mean power consumption, peak power consumption, etc.) associated with a particular period of time (e.g., from the prior point in time to a present point in time) with another cu ailment threshold, associated with the particular period of time, obtained from the control policies. In yet another example, energy application 550 may query device gateway server 230 to determine whether smart grid devices 225 corresponding to unforced capacity are capable of providing and/or generating additional power to offset the reduction in power received from the power grid as a result of the curtailment operation. In this example, energy application 550 may compute a curtailment capacity based on a curtailment threshold and unforced capacity to determine whether a curtailment operation can be performed in response to the demand.

As still further shown in FIG. 9, if a curtailment operation can be performed (block 915—YES), then a notification that a curtailment operation is to be performed may be sent in response to the demand-response request (block 920). For example, energy application 550 may determine that the total instantaneous power consumption is greater than the threshold and may send, to user device 210, a notification that a curtailment operation is to be performed in response to the demand. In another example, if energy application 550 determines that the total power consumption associated with the particular period of time is greater than the other threshold, then a notification that a curtailment operation is to be performed may be sent to user device 210 in response to the demand. In yet another example, energy application 550 may determine that particular smart grid devices 225, corresponding to the unforced capacity, are capable of providing and/or generating additional power to offset the reduction in power received from the power grid as a result of a curtailment operation. Based on the determination that the particular smart grid devices 225 can provide the additional power, energy application 550 may send, to user device 210, a notification that a curtailment operation is to be performed in response to the demand. Additionally, or alternatively, in this example, energy application 550 may send, to user device 210, a notification that an unforced capacity operation is to be performed in response to the demand.

As also shown in FIG. 9, process 900 may include sending a curtailment instruction in response to the demand-response request (block 925). For example, energy application 550 may, in a manner similar to that described above (with respect to block 835 of FIG. 8A) send an instruction to device gateway server 230 to power back all or a portion of smart grid devices 225 to reduce total power consumption in response to the demand. In another example, energy application 550 may, based on the control policies, send an instruction to power off all or a portion of smart grid devices 225. In yet another example, energy application 550 may, based on the control policies, send an instruction to perform an unforced capacity operation that includes switching power sources from the power grid to particular smart grid devices 225 associated with unforced capacity. In still another example, energy application 550 may, based on the control policies, send some combination instructions, such as powering back all or a portion of smart grid device 225, powering off all or a portion of smart grid device 225, and/or switching all or a portion of smart grid devices 225 from the power grid to the particular smart grid devices 225 associated with unforced capacity.

As further shown in FIG. 9, if a curtailment operation cannot be performed (block 915—NO), a notification that a curtailment operation cannot be performed may be sent in response to the demand (block 930). For example, if energy application 550 determines that the total instantaneous power consumption is less than or equal to the threshold, then a notification that a curtailment operation cannot be performed may be sent to user device 210 in response to the demand. In another example, if energy application 550 determines that the total power consumption associated with the particular period of time is less than or equal to than the other threshold, then a notification that a curtailment operation cannot be performed may be sent to user device 210 in response to the demand. In yet another example, energy application 550 may determine that particular smart grid devices 225, corresponding to the unforced capacity, cannot provide and/or generate additional power to offset the reduction in power received from the power grid as a result of a curtailment operation. Based on the determination that the particular smart grid devices 225 cannot provide the additional power, energy application 550 may send, to user device 210, a notification that a curtailment operation cannot be performed in response to the demand and process 900 may end.

Implementations described herein may provide for remote energy management using a persistent smart grid context. An energy application may receive information associated with a facility and/or information associated with smart grid devices associated with the facility and may generate a consumption profile for the facility and/or the smart grid devices. The energy application may use the consumption profile to establish control policies.

The energy application may obtain network content from smart grid devices associated with the facility using a tunneling protocol that permits web services to be used to obtain the network content from the smart grid devices. The energy application my use the network content to determine whether a device condition exists. The energy application may determine that a device condition exists when power consumption regarding the device exceeds a threshold and may send a notification in a user device and/or an instruction to remedy the device condition. The energy application may use the network content to determine whether a curtailment condition exists. The energy application may determine that a curtailment condition exists when total power consumption exceeds a total power threshold and may send a notification to a user device and/or an instruction to perform a curtailment operation. The energy application may use the network content to determine whether to perform an operation to replenish unforced capacity and/or to use unforced capacity to contribute power to a power grid. The energy application may send a notification to a user device and/or an instruction to perform the operation to replenish unforced capacity when a charge level regarding particular smart grid devices associated with power storage are below a charge threshold. The energy application may send a notification to a user device and/or an instruction to perform the operation to contribute power to a power grid when the charge level regarding the particular smart grid devices are greater than the charge threshold.

The energy application may obtain network content from smart grid devices associated with the facility and may use the network content to determine whether a curtailment operation can be performed in response to a demand. The energy application may determine that the total power consumption is greater than a threshold obtained from the energy management control policies and may send, to a user device, a notification that a curtailment operation is to be performed and/or an instruction to perform the curtailment operation.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6, 8A, 8B, and 9, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor that executes software).

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways no specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method performed by a network controller device, the method comprising:
  setting, at the network controller device, control policies including an energy consumption threshold associated with one or more smart grid devices of a smart grid network connected to a power grid associated with an external power source;

receiving, at the network controller device, network content including energy consumption data associated with the one or more smart grid devices;
comparing, responsive to receiving the network content, the energy consumption data to the energy consumption threshold associated with the one or more smart grid devices;
triggering, responsive to results of the comparing indicating that the energy consumption threshold is exceeded, a first operation to switch from using the power grid to using power capacity available from the one or more smart grid devices with respect to energy consumption associated with the smart grid network; and
triggering, responsive to results of the comparing indicating that the energy consumption threshold is not exceeded, a second operation with respect to replenishment of the power capacity associated with the smart grid network,
  wherein the replenishment of the power capacity comprises using power from the power grid for recharging, based on a charge threshold identified in the control policies, the one or more smart grid devices to a charge level at or below the charge threshold, and
  wherein when the charge level is at or above the charge threshold, the replenishment of the power capacity comprises energy generation by the one or more smart grid devices.

2. The method of claim 1, wherein the first operation further comprises curtailment of a consumption of energy, by the smart grid network, received via the power grid.

3. The method of claim 1, wherein the first operation further comprises use of the power capacity associated with the one or more smart grid devices.

4. The method of claim 3, wherein the use of the power capacity comprises using energy stored by the one or more smart grid devices.

5. The method of claim 3, wherein the use of the power capacity comprises using energy generated by the one or more smart grid devices.

6. The method of claim 1, wherein the first operation further comprises:
curtailment of a consumption of energy, by the smart grid network, received via the power grid, and
use of the power capacity associated with the one or more smart grid devices.

7. The method of claim 1, further comprising:
triggering, based on an agreement with respect to the connection between the smart grid network and the power grid, transmission of the generated energy to the power grid.

8. A network device comprising:
a memory to store control policies set for a network of smart grid devices connected to a power grid, the control policies including an energy consumption threshold associated with the network of smart grid devices; and
a processor configured to:
  obtain energy consumption data associated with the network of smart grid devices,
  compare the energy consumption data to the energy consumption threshold associated with the network of smart grid devices,
  generate, responsive to results of the comparing indicating that the energy consumption threshold is exceeded, a first instruction to switch from using the power grid to using power capacity available from the one or more smart grid devices with respect to energy consumption associated with the network of smart grid devices, and
  generate, responsive to results of the comparing indicating that the energy consumption threshold is not exceeded, a second instruction with respect to replenishment of the power capacity associated with the network of smart grid devices,
    wherein the second instruction corresponds to using power from the power grid for recharging, based on a charge threshold identified in the control policies, one or more of the smart grid devices to a charge level at or below the charge threshold, and
    wherein when the charge level is at or above the charge threshold, the second instruction corresponds to generating energy by the one or more of the smart grid devices.

9. The network device of claim 8, wherein the processor is further configured to:
generate another instruction for transmission of the generated energy to the power grid.

10. The network device of claim 8, wherein the first instruction further corresponds to curtailment of a consumption of energy, by the network of smart grid devices, received via the power grid.

11. The network device of claim 8, wherein the first instruction further corresponds to use of the power capacity associated with one or more of the smart grid devices.

12. The network device of claim 11, wherein the use of the power capacity comprises using energy stored by the one or more smart grid devices.

13. The network device of claim 11, wherein the use of the power capacity comprises using energy generated by the one or more smart grid devices.

14. The network device of claim 8, wherein the first instruction further corresponds to:
curtailment of a consumption of energy, by the network of smart grid devices, received via the power grid, and
use of the power capacity associated with one or more of the smart grid devices.

15. A system comprising:
a storage device to store control policies, associated with a network of smart grid devices that connect to a power grid, including a curtailment threshold corresponding to curtailing an amount of power, received via the power grid, related to a curtailment operation; and
a first device configured to:
  receive, from a second device associated with the power grid, a curtailment request with respect to a portion of the amount of power received via the power grid,
  obtain, from a third device, a value representing an amount of power capacity associated with the network of smart grid devices,
  determine a curtailment capacity based on a comparison of the curtailment threshold to the value representing an amount of power capacity,
  perform a comparison of the curtailment capacity to the curtailment request,
  generate, based on first results of the comparison, a first notification to not perform the curtailment operation responsive to an amount of power indicated in the curtailment request exceeding the curtailment capacity, generate, in response to generation of the first notification, a second notification to perform a replenishment of the power capacity, including:
    using the power grid for recharging, based on a charge threshold identified in the control policies, one or more of the smart grid devices to a charge level at or below the charge threshold, and
    when the charge level is at or above the charge threshold, generating energy by the one or more smart grid devices, and
generate, based on second results of the comparison, a third notification to perform the curtailment operation responsive to an amount of power indicated in the curtailment request not exceeding the curtailment capacity, wherein the curtailment operation includes switching from the power grid to using the power capacity available from the one or more smart grid devices.

16. The system of claim 15, wherein, when obtaining the value representing the amount of power capacity, the first device is further configured to determine:
    an amount of stored energy available from one of more of the smart grid devices, and
    an energy generation capacity for one or more of the smart grid devices.

17. The system of claim 15, wherein performing a replenishment of the power capacity further comprises transmitting the energy generated by the one or more smart grid devices to the power grid.

18. The system of claim 15, wherein, when obtaining the value representing an amount of power capacity, the first device is further configured to determine an amount of stored energy available from one of more of the smart grid devices.

19. The system of claim 15, wherein, when obtaining the value representing an amount of power capacity, the first device is further configured to determine an energy generation capacity for one of more of the smart grid devices.

20. The system of claim 15, wherein performing a replenishment of the power capacity further includes transmitting the energy stored by the one or more smart grid devices to the power grid.

* * * * *